US012018814B2

(12) United States Patent
Caprara et al.

(10) Patent No.: US 12,018,814 B2
(45) Date of Patent: Jun. 25, 2024

(54) LIGHT EMITTING DEVICE WITH ADAPTABLE GLARE CLASS

(71) Applicant: Schreder S.A., Brussels (BE)

(72) Inventors: Roxane Caprara, Neupré (BE); Paul Smets, Liége (BE); Maxime Dietens, Liége (BE)

(73) Assignee: Schreder S.A., Brussels (BE)

( * ) Notice: Subject to any disclaimer, the term of this patent is extended or adjusted under 35 U.S.C. 154(b) by 101 days.

(21) Appl. No.: 17/618,063

(22) PCT Filed: Jun. 11, 2020

(86) PCT No.: PCT/EP2020/066221
§ 371 (c)(1),
(2) Date: Dec. 10, 2021

(87) PCT Pub. No.: WO2020/249684
PCT Pub. Date: Dec. 17, 2020

(65) Prior Publication Data

US 2022/0307673 A1 Sep. 29, 2022

(30) Foreign Application Priority Data

Jun. 12, 2019 (NL) ...................................... 2023295

(51) Int. Cl.
*F21V 13/04* (2006.01)
*F21V 5/00* (2018.01)
(Continued)

(52) U.S. Cl.
CPC .............. *F21V 13/04* (2013.01); *F21V 5/007* (2013.01); *F21V 7/0083* (2013.01); *F21Y 2105/16* (2016.08); *F21Y 2115/10* (2016.08)

(58) Field of Classification Search
CPC ......... F21V 13/04; F21V 5/007; F21V 7/0083
See application file for complete search history.

(56) References Cited

U.S. PATENT DOCUMENTS

| | | | | |
|---|---|---|---|---|
| 8,858,024 B2 * | 10/2014 | Wu | ........................... | F21K 9/60 362/240 |
| 9,903,561 B1 | 2/2018 | Chen et al. | | |

(Continued)

FOREIGN PATENT DOCUMENTS

| | | |
|---|---|---|
| DE | 202013010052 U1 | 2/2015 |
| EP | 2871411 A1 | 5/2015 |

(Continued)

OTHER PUBLICATIONS

PCT International Search Report and Written Opinion, Application No. PCT/EP2020/066221, mailed Jul. 29, 2020, 12 pages.

*Primary Examiner* — Tracie Y Green
*Assistant Examiner* — Michael Chiang
(74) *Attorney, Agent, or Firm* — McDonnell Boehnen Hulbert & Berghoff LLP

(57) ABSTRACT

Example embodiments relate to light emitter devices with adaptable glare classes. One example light emitting device includes a carrier. The light emitting device also includes a plurality of light sources disposed on the carrier. Additionally, the light emitting device includes a lens plate disposed on the carrier. The lens plate includes a flat portion and a plurality of lenses covering the plurality of light sources. Further, the light emitting device includes a light shielding structure mounted on said lens plate. The light shielding structure includes a plurality of closed reflective barrier walls, each having an interior bottom edge disposed on the flat portion, an interior top edge at a height above the flat portion, and a reflective surface connecting the interior bottom edge and the interior top edge and surrounding one or more associated lenses of the plurality of lenses. The height is at least 2 mm.

20 Claims, 11 Drawing Sheets

(51) Int. Cl.

| | |
|---|---|
| ***F21V 7/00*** | (2006.01) |
| *F21Y 105/16* | (2016.01) |
| *F21Y 115/10* | (2016.01) |

(56) References Cited

U.S. PATENT DOCUMENTS

| | | | | |
|---|---|---|---|---|
| 2008/0272380 | A1 | 11/2008 | Wilcox | |
| 2008/0273327 | A1* | 11/2008 | Wilcox | F21V 5/007 362/311.06 |
| 2011/0292658 | A1* | 12/2011 | Ho | F21V 5/048 362/307 |
| 2013/0107525 | A1* | 5/2013 | Woodgate | F21V 5/007 362/237 |
| 2014/0063802 | A1* | 3/2014 | Garcia | F21V 5/08 362/241 |
| 2014/0268796 | A1* | 9/2014 | Yoder | F21V 29/70 362/346 |
| 2015/0003059 | A1* | 1/2015 | Haitz | G02B 19/0028 362/235 |
| 2016/0215955 | A1* | 7/2016 | Donato | F21V 5/007 |
| 2019/0376663 | A1* | 12/2019 | Gladden | F21V 7/043 |

FOREIGN PATENT DOCUMENTS

| | | | |
|---|---|---|---|
| EP | 2966346 | A1 | 1/2016 |
| KR | 101468311 | B1 | 12/2014 |

* cited by examiner

LIGHT EMITTING DEVICE WITH ADAPTABLE GLARE CLASS

CROSS-REFERENCE TO RELATED APPLICATIONS

The present application is a national stage entry of PCT/EP2020/066221 filed Jun. 11, 2020, which claims priority to NL 2023295 filed Jun. 12, 2019, the contents of each of which are hereby incorporated by reference.

FIELD OF INVENTION

The present invention relates to a light emitting device, and more particularly, to a light emitting device with an improved G/G* classification.

BACKGROUND

Optical elements, such as light emitting diodes (LEDs) and lenses, comprised in standard light emitting devices may emit light at large angles. In the designs of conventional light emitting devices, such as LED devices, the light rays generated by the light source may have large angles below the horizontal, and thus may result in glare that would cause discomfort for the user.

Therefore, light emitting devices, in particular outdoor luminaires, must comply with different glare classifications, usually abbreviated G or G* classifications. The G classification is defined in the CIE115:2010 standard, whereas the G* classification is defined by the EN 13201-2 standard. Such classifications are based on the maximal allowed ratio between the light intensity and the light flux at large angles below the horizontal, such ratio being generally expressed in cd/klm. The lowest G/G* classification, or G1/G*1 class, corresponds to the glariest situation for the user, causing the highest discomfort, whereas the highest G/G* classification, or G6/G*6 class, corresponds to the most comfortable situation for the user.

In order to reduce light intensities at large angles and improve the G/G* classification of a light emitting device, improved optical elements can be developed and manufactured. While the above mentioned goal can be achieved, manufacturing such optical elements can be time consuming and expensive, requiring large investment costs for replacing the existing optical elements on the light emitting devices. Moreover, in order to adapt the G/G* classification of a light emitting device, different types of optical elements are required, each given type corresponding to a given G/G* classification. Finally, for each type of optical elements corresponding to each G/G* classification, additional categories of optical elements may be required depending on the road type, e.g. depending on the width of a road (residential road, traffic route, highway, pedestrian path, etc.), or depending on its location (inside a city, in the countryside, etc.). This has the effect of increasing the amount of different optical elements to be manufactured in order to answer every need from the customers. This solution may involve high development, manufacturing, and maintenance costs.

SUMMARY

The object of embodiments of the invention is to provide a light emitting device comprising a light shielding structure. More in particular, embodiments of the invention aim at providing a light emitting device comprising a light shielding structure configured for reducing a solid angle of light beams by cutting off or reflecting light rays having a large incident angle, thereby reducing the light intensities at large angles and improving the G/G* classification of the light emitting device.

According to a first aspect of the invention, there is provided a light emitting device comprising a carrier, a plurality of light sources disposed on the carrier, a lens plate disposed on the carrier, and a light shielding structure mounted on said lens plate. The lens plate comprises a flat portion and a plurality of lenses covering the plurality of light sources. The light shielding structure comprises a plurality of closed reflective barrier walls, each having an interior bottom edge disposed on said flat portion, an interior top edge at a height above said flat portion, and a reflective surface connecting the interior bottom edge and the interior top edge and surrounding one or more associated lenses of said plurality of lenses. Said height is at least 2 mm, preferably at least 3 mm. The interior bottom edge defines a first closed line and the interior top edge defines a second closed line, said first closed line and said second closed line comprising at least one curved portion over at least 15%, preferably over at least 20%, more preferably over at least 25%, of a perimeter of said first closed line and a perimeter of said second closed line, respectively. Said reflective surface is configured for reducing a solid angle Ω of light beams emitted through the one or more associated lenses of said plurality of lenses. Typically, said first closed line and said second closed line may comprise at least one curved portion over at least 30%, even over at least 35%, of a perimeter of said first closed line and a perimeter of said second closed line, respectively.

Embodiments of the invention are based inter alia on the insight that light emitting devices generally incorporate optical elements which are costly, of complex design, and can be the cause of delays in the fabrication line. To overcome the problem of manufacturing different types of optical elements according to different G/G* classifications a light emitting device must comply with, a light emitting device comprising a light shielding structure as defined above can be used, resulting in a cheaper solution whilst being able to achieve a high G/G* classification. Moreover, with the light emitting device as defined above, it is also possible to easily achieve various G/G* classifications with a given optical element, e.g. by varying the number and/or height and/or shape of closed reflective barrier walls.

The reflective surface of each closed reflective barrier wall comprised in the light shielding structure is configured for reducing a solid angle of light beams emitted through the one or more associated lenses of said plurality of lenses. A solid angle, denoted as Ω, is a measure of the amount of the field of view from some particular point that a given object covers. The point from which the object is viewed is called the apex of the solid angle, and the object is said to subtend its solid angle from that point. In the International System of Units (SI), a solid angle Ω is expressed in a dimensionless unit called a steradian (sr). One steradian corresponds to one unit of area on the unit sphere surrounding the apex. In particular, the solid angle Ω of a cone with its apex at the apex of the solid angle Ω, and with apex angle 2θ, is the area of a spherical cap on a unit sphere equal to $\Omega=2\pi(1-\cos\theta)=4\pi\sin^2(\theta/2)$. Hence, the light shielding structure as defined above enables a reduction of the light intensities at large half apex angles θ, thereby improving the G/G* classification of the light emitting device.

Also, the at least one curved portion of said first closed line and said second closed line enables to reduce or avoid discontinuities in the light distribution of the light emitting device. Indeed, such discontinuity in the light distribution may arise from geometric discontinuities at junctions of straight lines of the closed reflective barrier walls, e.g. in closed lines such as a square, a rectangle, or any other polygon. In addition, a minimal height of the plurality of closed reflective barrier walls of at least 2 mm, preferably at least 3 mm, enables the light shielding structure to reduce said solid angle Ω thereby improving the G/G* classification of the light emitting device.

Preferred embodiments relate to a light shielding structure for use in an outdoor luminaire. By outdoor luminaire, it is meant luminaires which are installed on roads, tunnels, industrial plants, campuses, stadiums, airports, harbors, rail stations, parks, cycle paths, pedestrian paths or in pedestrian zones, for example, and which can be used notably for the lighting of an outdoor area, such as roads and residential areas in the public domain, private parking areas and access roads to private building infrastructures, etc.

Other embodiments relate to a light shielding structure for use in an indoor luminaire system. By indoor luminaire, it is meant luminaires which are installed inside schools, universities, shopping malls, warehouses, factories, industrial plants, stadiums, airports, harbors, rail stations, for example, and which can be used notably for the lighting of an indoor area in the public domain, such as schools, airports, rail stations, or in the private domain, such as shopping malls, factories, building infrastructures, etc.

In a preferred embodiment, the reflective surface is configured for reducing said solid angle from a first solid angle Ω1 between a predetermined solid angle and 2π sr to a second solid angle Ω2 smaller than 7π/4 sr, preferably smaller than 5π/3 sr, more preferably smaller than 3π/2 sr. By definition, a solid angle Ω=2π (sr corresponds to a half sphere. A solid angle Ω=7π/4 sr corresponds to a half apex angle θ=82.8° of a cone, a solid angle Ω=5π/3 sr corresponds to a half apex angle θ=80.4° of a cone, and a solid angle Ω=3π/2 sr corresponds to a half apex angle θ=75.5° of a cone.

In an exemplary embodiment, the predetermined solid angle is larger than 3π/2 sr, preferably larger than 5π/3 sr, more preferably larger than 7π/4 sr.

In other words, typically a light source and a corresponding lens used in embodiments of the invention generate a light beam with a first solid angle Ω1 larger than 3π/2 sr, possibly even larger than 5π/3 sr, and possibly even larger than 7π/4 sr. The above-mentioned range for the predetermined solid angle enables the selection of large half apex angles θ that correspond to glaring angles. Since the reflective surface is configured for reducing a solid angle Ω of light beams emitted through the one or more associated lenses of said plurality of lenses, the light shielding structure enables to avoid that an incident light ray having a large half apex angle θ may have a glaring angle for a user.

In a preferred embodiment, the plurality of lenses is a plurality of lenses having a lens symmetry plane substantially perpendicular to the flat portion. Preferably, the plurality of lenses is a plurality of non-rotation symmetric lenses.

In an embodiment, one or more other optical elements may be provided to the lens plate, such as reflectors, backlights, prisms, collimators, diffusors, and the like. For example, there may be associated a backlight element with some lenses or with each lens of the plurality of lenses. Those one or more other optical elements may be formed integrally with the lens plate. In other embodiments, those one or more other optical elements may be formed integrally with the light shielding structure, and/or mounted on the lens plate and/or on the light shielding structure via releasable fastening elements. In the context of the invention, a lens may include any transmissive optical element that focuses or disperses light by means of refraction. It may also include any one of the following: a reflective portion, a backlight portion, a prismatic portion, a collimator portion, a diffusor portion. For example, a lens may have a lens portion with a concave or convex surface facing a light source, or more generally a lens portion with a flat or curved surface facing the light source, and optionally a collimator portion integrally formed with said lens portion, said collimator portion being configured for collimating light transmitted through said lens portion. Also, a lens may be provided with a reflective portion or surface or with a diffusive portion.

In an embodiment where a lens is provided with a reflective portion or surface, referred to as a backlight element in the context of the invention, a closed reflective barrier wall surrounding said lens may comprise a portion nearest to and facing said backlight element with a height lower than a height of said backlight element. Alternatively, in an embodiment where a lens is not provided with a backlight element, a portion of a closed reflective barrier wall may be higher than the remaining portions of said closed reflective barrier wall, said portion playing the role of a backlight element.

A lens of the plurality of lenses may comprise a lens portion having an outer surface and an inner surface facing the associated light source. The outer surface may be a convex surface and the inner surface may be a concave or planar surface. Also, a lens may comprise multiple lens portions adjoined in a discontinuous manner, wherein each lens portion may have a convex outer surface and a concave or planar inner surface.

Hence, lenses that can be used in combination with the light shielding structure are not limited to rotation-symmetric lenses such as hemispherical lenses, or to ellipsoidal lenses having a major symmetry plane and a minor symmetry plane, although such rotation-symmetric lenses could be used. Alternatively, lenses with no symmetry plane or symmetry axis could be envisaged.

In a preferred embodiment, the plurality of closed reflective barrier walls has a wall symmetry plane substantially perpendicular to the flat portion.

In an embodiment, the lens symmetry plane is substantially parallel to the wall symmetry plane. In a preferred embodiment, the lens symmetry plane coincides with the wall symmetry plane.

In a preferred embodiment, a dimension of a closed reflective barrier wall of the plurality of closed reflective barrier walls along the wall symmetry plane is greater than a dimension of an associated lens along the lens symmetry plane, preferably by maximum 50% of said dimension.

In a preferred embodiment, a dimension of a closed reflective barrier wall of the plurality of closed reflective barrier walls in a direction perpendicular to the wall symmetry plane is greater than a dimension of an associated lens in a direction perpendicular to the lens symmetry plane, preferably by maximum 50% of said dimension.

In embodiments where a closed reflective barrier wall is surrounding more than one associated lens, said dimension along the lens symmetry plane corresponds to the sum of the dimensions of the associated lenses along the lens symmetry plane, and said dimension perpendicular to the lens symmetry plane corresponds to the sum of the dimensions of the associated lenses perpendicular to the lens symmetry plane.

In a preferred embodiment, a curvature in a direction parallel to the lens symmetry plane of the first closed line and/or the second closed line is substantially equal to a curvature in said direction of a projection of an associated lens perpendicular to the flat portion. For example, when the curvature in the direction parallel to the lens symmetry plane of said projection of the associated lens is convex (concave), the curvature in said direction of the first closed line and/or the second closed line is also convex (concave).

In a preferred embodiment, a curvature in a direction perpendicular to the lens symmetry plane of the first closed line and/or the second closed line is substantially equal to a curvature in said direction of a projection of an associated lens perpendicular to the flat portion. For example, when the curvature in the direction perpendicular to the lens symmetry plane of said projection of the associated lens is convex (concave), the curvature in said direction of the first closed line and/or the second closed line is also convex (concave).

In this way, it is ensured that the shape (or geometry) and/or dimension of a closed reflective barrier wall substantially follows the shape (or geometry) and/or dimension of an associated lens, thereby ensuring that said plurality of closed reflective barrier walls are configured for reducing a solid angle of light beams emitted through the one or more associated lenses of said plurality of lenses.

In a preferred embodiment, the reflective surface comprises any one of a flat surface, a concave surface, a convex surface, or a combination thereof. The sloping surface shape may be the same for the reflective sloping surface of each closed reflective barrier wall, or may be different from one closed reflective barrier wall to another. Preferably, an angle between an axis perpendicular to the flat portion and an axis tangent to the reflective surface is comprised between 0° and 20°, more preferably between 0° and 15°. In an example, said angle may be substantially 0°, i.e., the axis tangent to the reflective surface may be substantially parallel to the axis perpendicular to the flat portion. In other words, the reflective surface may be oriented substantially vertically, i.e., may be substantially perpendicular to the flat portion. In another example, said angle may be not null, i.e., the axis tangent to the reflective surface may be inclined with respect to the axis perpendicular to the flat portion. In other words, the reflective surface may be oblique, i.e., may not be substantially perpendicular to the flat portion but may be inclined with respect to the flat portion.

In this way, by adapting a shape of the reflective surface, the solid angle of light beams emitted through the one or more associated lenses of said plurality of lenses can be further reduced. The above range for the angle between the axis perpendicular to the flat portion and the axis tangent to the reflective surface enables to provide a reflective surface which is vertical or close to vertical, thereby intercepting and reflecting incident light rays efficiently and reducing said solid angle.

In a preferred embodiment, a surface roughness of the reflective surface corresponds to any one of a coarse surface finish, a polished surface finish, or a combination thereof. The surface roughness may be the same for the reflective sloping surface of each closed reflective barrier wall, or may be different from one closed reflective barrier wall to another.

In an exemplary embodiment, the first closed line and the second closed line comprise at least one curved portion over at least 50%, preferably over at least 75%, of a perimeter of said first closed line and a perimeter of said second closed line, respectively.

In an exemplary embodiment, the first closed line and the second closed line comprise at least one curved portion around at least 90°, preferably around at least 180°, more preferably around at least 270°, of said first closed line and said second closed line, respectively.

In an exemplary embodiment, a projection of the first closed line on a plane parallel to the flat portion is a first ellipse, and a projection of the second closed line on said plane is a second ellipse.

Ellipses are the simplest non-rotational symmetric closed curved lines having two symmetry axes, namely a major axis and a minor axis perpendicular to the major axis. The use of ellipses ensures that the shape of the plurality of closed reflective barrier walls substantially follow the dimensions of the plurality of lenses, in particular when the plurality of lenses is a plurality of lenses, preferably non-rotation symmetric, having a lens symmetry plane substantially perpendicular to the flat portion. Hence, ellipses ensure that said plurality of closed reflective barrier walls are configured for reducing a solid angle of light beams emitted through the one or more associated lenses of said plurality of lenses.

In an embodiment, the first ellipse has a minor axis substantially parallel to the lens symmetry plane, and/or the second ellipse has a minor axis substantially parallel to the lens symmetry plane. In a preferred embodiment, the minor axis of the first ellipse coincides with the minor axis of the second ellipse. In a preferred embodiment, a major axis of the first ellipse coincides with a major axis of the second ellipse.

In an exemplary embodiment, a surface area delimited by the first ellipse is different from a surface area delimited by the second ellipse, preferably smaller than said surface area delimited by the second ellipse, and the reflective surface is a conical surface. In another exemplary embodiment, a surface area delimited by the first ellipse is equal to a surface area delimited by the second ellipse, and the reflective surface is a cylindrical surface.

In a preferred embodiment, the plurality of lenses is aligned into a plurality of rows and a plurality of columns to form a two-dimensional array of lenses. Similarly, in a preferred embodiment the plurality of closed reflective barrier walls is aligned into a plurality of rows and a plurality of columns to form a two-dimensional array of closed reflective barrier walls.

A lens plate comprising a two-dimensional array formed by rows and columns of lenses is typically found in light emitting devices such as outdoor luminaires. In this way, the two-dimensional array of closed reflective barrier walls can match the two-dimensional array of lenses.

In an exemplary embodiment, said plurality of columns is formed along the lens symmetry plane.

In an embodiment, the height of the plurality of closed reflective barrier walls is variable along the second closed line.

In this way, the configuration of the plurality of closed reflective barrier walls may be further adapted in order to reduce said solid angle $\Omega$ by specifically cutting off or reflecting incident light rays having a selected azimuthal angle $\varphi$, referring to the spherical coordinate system $(r, \theta, \varphi)$. In other words, for selected values of $\varphi$, the height of the plurality of closed reflective barrier walls may be smaller or larger than the height of said plurality of closed reflective barrier walls for other values of $\varphi$. Said selected values of $\varphi$ may depend on the geometry of the plurality of lenses, i.e., on the geometry of light beams emitted through said plurality of lenses.

In an exemplary embodiment, the height of the plurality of closed reflective barrier walls is between 30% and 150% of a height of the plurality of lenses, preferably between 60% and 120%, most preferably between 70% and 110%. In another exemplary embodiment, the height of the plurality of closed reflective barrier walls may be larger than a height of the plurality of lenses, preferably larger than 110% of said height. The height of the lens corresponds to the distance between a plane including the upper surface of the flat portion and the highest point of a lens. Preferably, the distance between two adjacent light sources is smaller than 60 mm, more preferably smaller than 50 mm, most preferably smaller than 40 mm. Typically the distance between two adjacent light sources will be larger than 20 mm. Preferably, the height of the plurality of closed reflective barrier walls is smaller than 10 mm, more preferably smaller than 8 mm, most preferably smaller than 7 mm. In addition, as mentioned above said height is at least 2 mm, preferably at least 3 mm.

This range of heights enables the plurality of closed reflective barrier walls to efficiently cut off or reflect light rays having a large half apex angle θ, thereby reducing said solid angle Ω and enabling to efficiently adapt the G/G* classification of the light emitting device, while minimizing the loss of light emitted by the light emitting device.

In a preferred embodiment, the light shielding structure further comprises a connecting means configured for connecting the plurality of closed reflective barrier walls.

In this manner, by connecting the plurality of closed reflective barrier walls the connecting means offers more rigidity to the light shielding structure. Moreover, the connecting means facilitates the mounting of the light shielding structure on the lens plate.

In an exemplary embodiment, the connecting means is disposed between two adjacent rows of said plurality of rows of lenses.

In a preferred embodiment, the plurality of closed reflective barrier walls and the connecting means are integrally formed. Alternatively, the plurality of closed reflective barrier walls may be releasably fastened to the connecting means, e.g. clipped.

In this way, the design and the manufacture of the light shielding structure are facilitated, especially when the light shielding structure is molded. The rigidity and mechanical resistance of the entire structure are also improved. Moreover, the mounting of the light shielding structure on the lens plate is facilitated.

In an exemplary embodiment, a material of the light shielding structure comprises plastic, preferably a plastic with good reflective properties, e.g. a white plastic. The light shielding structure is optionally covered with reflective painting or with a reflective coating.

Plastic is a light, cheap, and easy to mold material. It also offers rigidity and mechanical resistance to the light shielding structure.

In a preferred embodiment, the light shielding structure is mounted on the lens plate by means of releasable fastening elements.

A further reduction of the light intensities at large angles can be realized by providing additional closed reflective barrier walls to the lens plate. Alternatively, it is possible to vary the height of one or more closed reflective barrier walls, or to vary the number and/or the height and/or the shape of the closed reflective barrier walls in order to adapt the light intensities of the light emitting device at large angles θ.

In an exemplary embodiment, the releasable fastening elements comprise any one or more of the following elements: screws, locks, clamps, clips, or a combination thereof.

In an exemplary embodiment, the connecting means is provided with holes, and the releasable fastening elements are located into said holes. Optionally, the lens plate is provided with holes for fixation to the carrier. The carrier may comprise a printed circuit board (PCB).

In this manner, the rigidity and the respective functionalities of both the closed reflective barrier walls and the connecting means are not altered significantly by the presence of the releasable fastening elements.

In a possible embodiment, one or more recesses, such as one or more holes and/or channels, may be arranged in the lens plate, into which the light shielding structure may be clipped or slid. To that end, the interior bottom edge of the light shielding structure may be provided with one or more protrusions, e.g. one or more pins and/or ribs, which fit in the one or more recesses. In addition or alternatively, one or more protrusions, such as pins or ribs, may be provided to the lens plate, said one or more protrusions being configured for cooperating with complementary features of the light shielding structure in order to secure the light shielding structure to the lens plate.

In yet another exemplary embodiment, the light shielding structure is integrally formed with the lens plate.

In a preferred embodiment, the lens plate is disposed on the carrier by screwing, locking, clamping, clipping, gluing, or a combination thereof.

Screwing, locking, clamping, clipping, and the like correspond to releasable fastening means, thereby enabling the maintenance or the replacement of the lens plate and/or of the carrier.

It is noted that the same fastening means may fasten the light shielding structure to the lens plate and the lens plate to the carrier, e.g. a screw or clip passing through the light shielding structure and through the lens plate and being screwed or clipped in the carrier.

In a preferred embodiment, the plurality of light sources comprises light emitting diodes (LED).

LEDs have numerous advantages such as long service life, small volume, high shock resistance, low heat output, and low power consumption.

According to a second aspect of the invention, there is provided a light shielding structure for use in a light emitting device according to the first aspect of the invention, said light shielding structure comprising a plurality of closed reflective barrier walls, each having an interior bottom edge, an interior top edge at a height above said interior bottom edge, and a reflective surface connecting the interior bottom edge and the interior top edge. Said height is at least 2 mm, preferably at least 3 mm. The interior bottom edge defines a first closed line and the interior top edge defines a second closed line, said first closed line and said second closed line comprising at least one curved portion over at least 15%, preferably over at least 20%, more preferably over at least 25%, of a perimeter of said first closed line and a perimeter of said second closed line, respectively. Said reflective surface is configured for reducing a solid angle of light beams.

Preferred features of the light shielding structure disclosed above in connection with the light emitting device may also be used in embodiments of the light shielding structure of the invention.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF EMBODIMENTS

Figure 1A:
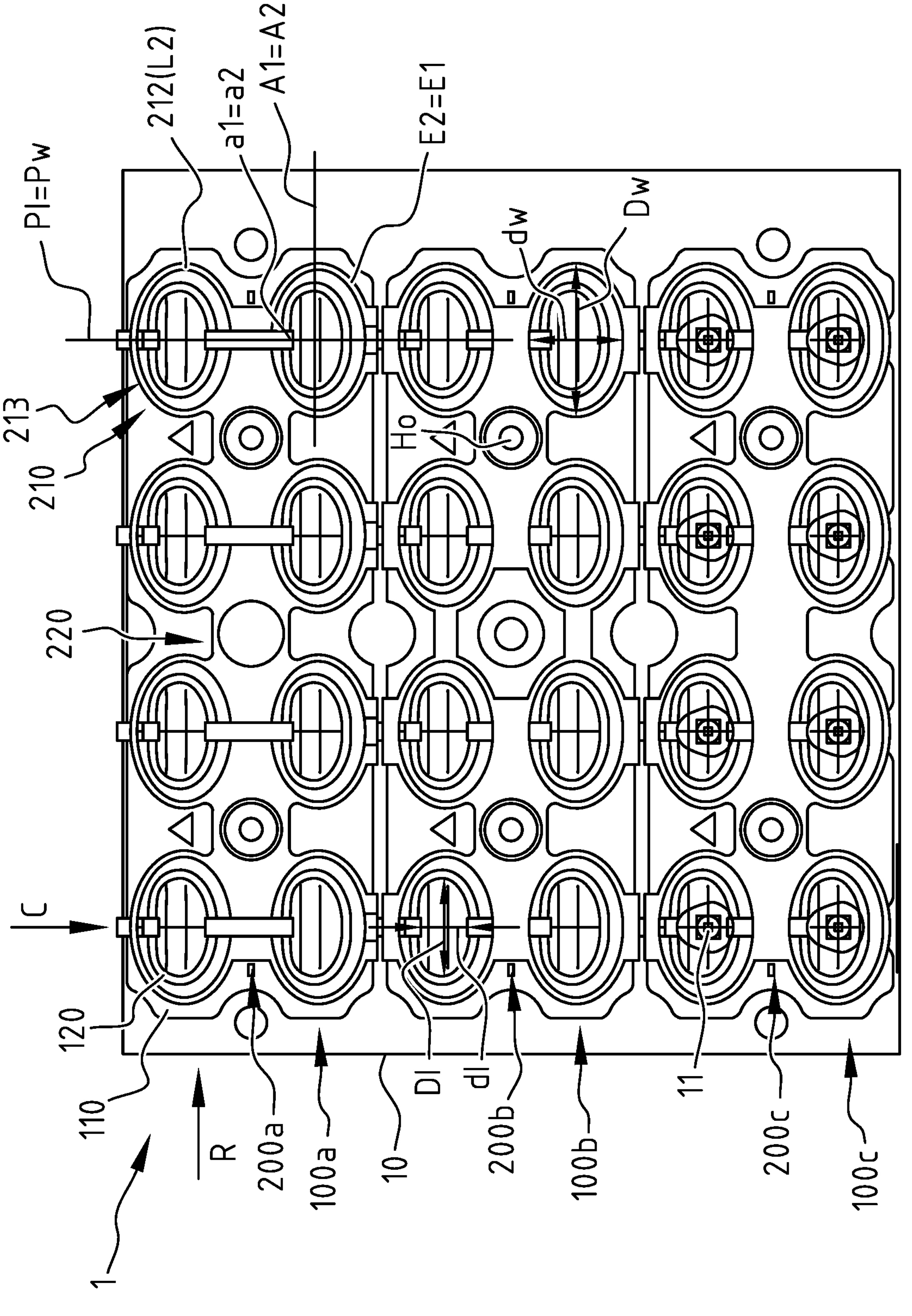
FIGS. 1A and 1B respectively show a top view of an exemplary embodiment of a light emitting device and a perspective view of a portion of an exemplary embodiment of a light emitting device.
Figure 1B:
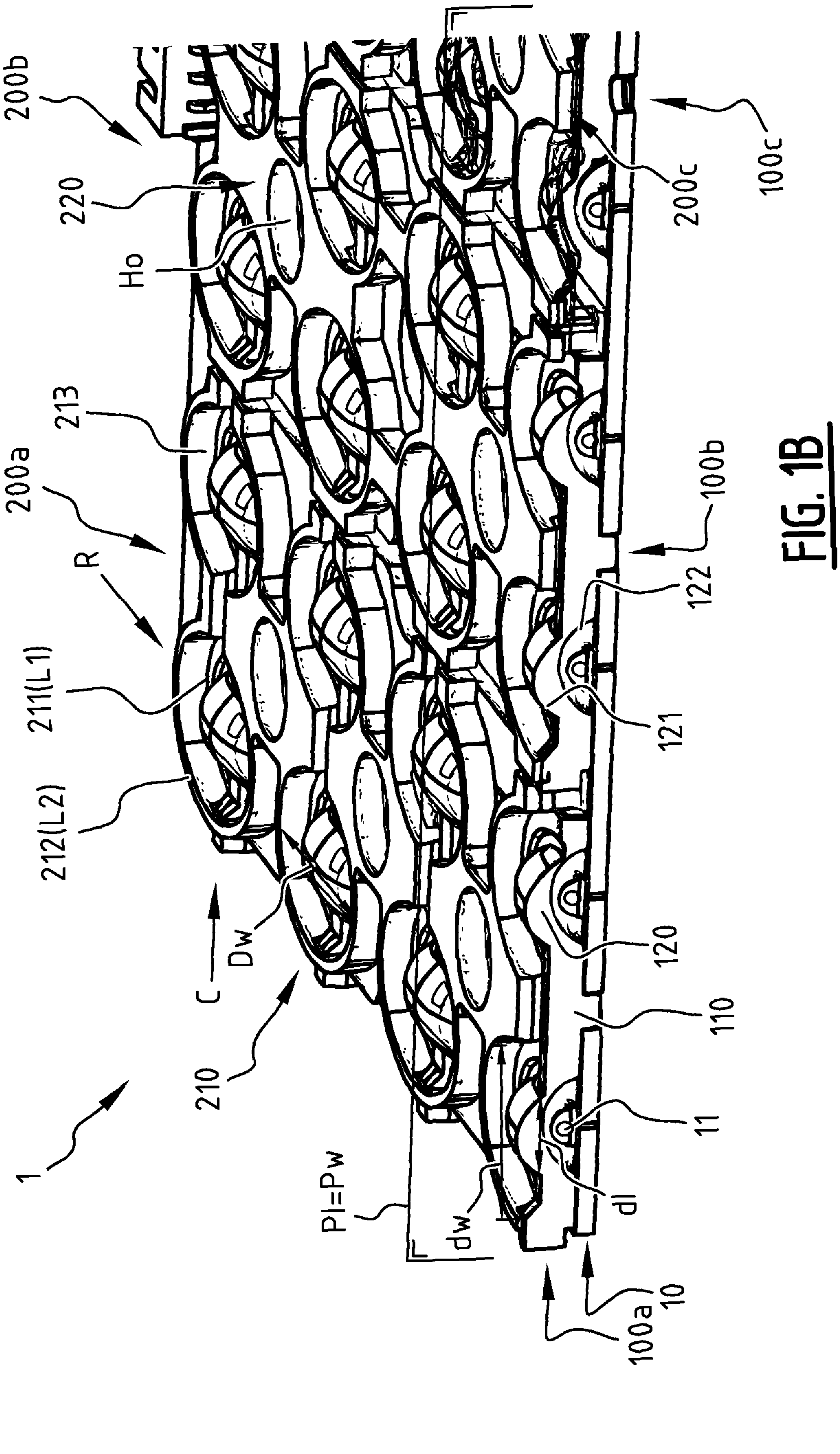

FIGS. 1A and 1B respectively show a top view of an exemplary embodiment of a light emitting device and a perspective view of a portion of an exemplary embodiment of a light emitting device.

As illustrated in the embodiment of FIGS. 1A and 1B, the light emitting device 1 comprises a carrier 10, a plurality of light sources disposed on the carrier 10, a lens plate 100 disposed on the carrier 10, and a light shielding structure 200 mounted on said lens plate 100. The lens plate 100 comprises a flat portion 110 and a plurality of lenses 120 covering the plurality of light sources 11 located underneath lenses 120 in a way known to a person skilled in the art. The light shielding structure 200 comprises a plurality of closed reflective barrier walls 210. The closed reflective barrier wall 210 has an interior bottom edge 211 disposed on said flat portion 110, a interior top edge 212 at a height H (not shown, see FIG. 7A) above the flat portion 110, and a reflective surface 213 connecting the interior bottom edge 211 and the interior top edge 212 and surrounding an associated lens 120 of said plurality of lenses 120. In the embodiment of FIGS. 1A and 1B, only one lens 120 is associated with a single closed reflective barrier wall 210, but the skilled person understands that in other embodiments a plurality of lenses 120 may be associated with a single closed reflective barrier wall (see FIGS. 5A and 5B discussed below). The interior bottom edge 211 defines a first closed line L1 and the interior top edge 212 defines a second closed line L2, said first closed line L1 and said second closed line L2 comprising at least one curved portion over at least 15%, preferably over at least 20%, more preferably over at least 25%, of a perimeter of said first closed line L1 and a perimeter of said second closed line L2, respectively.

Figure 2A:
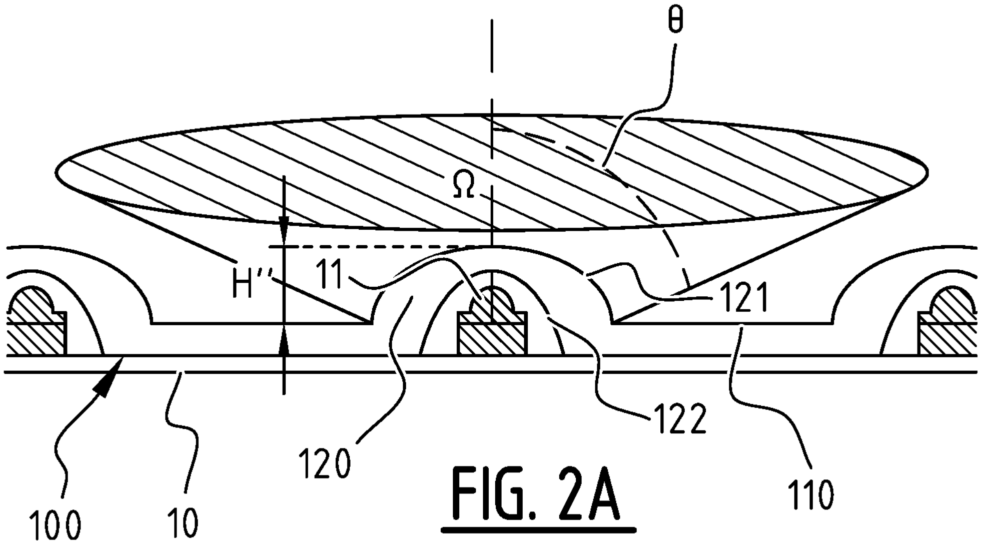
FIGS. 2A and 2B respectively illustrate a light beam emitted by a light source through a lens and by an exemplary embodiment of a light source and a lens surrounded by a closed reflective barrier wall.

The lens 120 may be a non-rotation symmetric lens 120 having a lens symmetry plane Pl substantially perpendicular to the flat portion 110. The lens 120 may comprise a lens portion having an outer surface 121 (see also 121 of FIG. 2A) and an inner surface 122 (see also 122 of FIG. 2A) facing the associated light source 11 (see also 11 of FIG. 2A). The outer surface 121 may be a convex surface and/or the inner surface 122 may be a concave surface, as illustrated in the embodiments of FIGS. 1B and 2A. In other non-illustrated variants, a lens may comprise multiple lens portions adjoined in a continuous or discontinuous manner, wherein each lens portion may have a convex outer surface and/or a concave inner surface. Alternatively, each lens portion may have a convex outer surface and a flat inner surface, or a flat outer surface and a concave inner surface. Alternatively or additionally to lenses 120, the lens plate 100 may comprise other optical elements (not shown), such as reflectors, backlights, prisms, collimators, diffusors, and the like. The lens plate 100 may further comprise a plurality of backlight elements (not shown; see definition below). A backlight element of the plurality of backlight elements may be associated with each lens of the plurality of lenses 120, and may be arranged substantially perpendicular to the lens symmetry plane Pl. In other embodiments, backlight elements may be associated with only a subset of the plurality of lenses 120. In an embodiment where a lens is provided with a reflective portion or surface, referred to as a backlight element in the context of the invention, a closed reflective barrier wall surrounding said lens may comprise a portion nearest to and facing said backlight element with a height lower than a height of said backlight element. Alternatively, in an embodiment where a lens is not provided with a backlight element, a portion of a closed reflective barrier wall may be higher than the remaining portions of said closed reflective barrier wall, said portion playing the role of a backlight element. Those one or more other optical elements, such as backlight elements, may be formed integrally with the lens plate. In other embodiments, those one or more other optical elements may be formed integrally with the light shielding structure, and/or mounted on the lens plate and/or on the light shielding structure via releasable fastening elements. Optionally, the lens plate 100 is provided with holes for fixation to the carrier 10. The carrier 10 may comprise a printed circuit board (PCB). The lens plate 100 may be disposed on the carrier 10 by screwing, locking, clamping, clipping, or a combination thereof. The plurality of light sources may comprise light emitting diodes (LEDs).

Figure 2B:
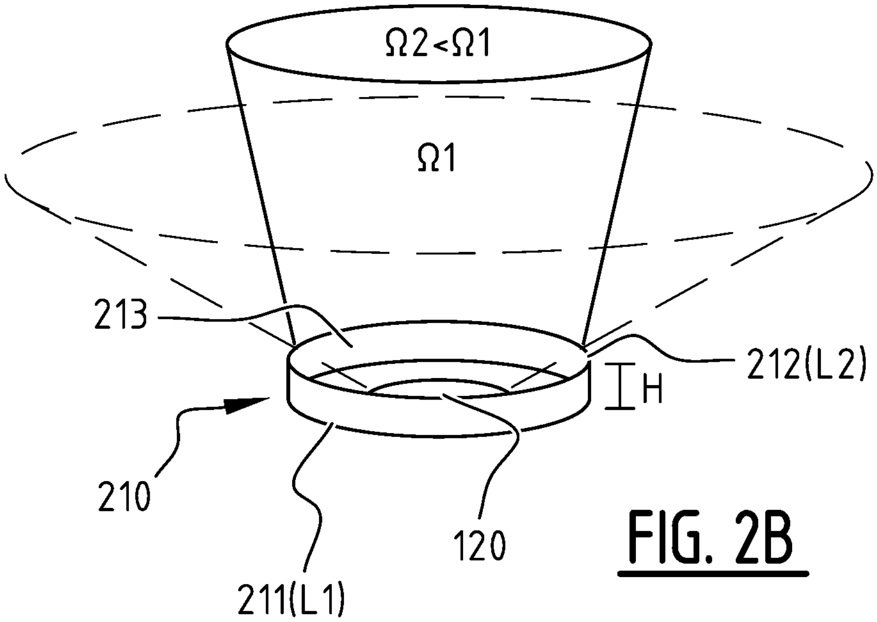

FIGS. 2A and 2B respectively illustrate a light beam emitted by a light source through a lens and by an exemplary embodiment of a light source and a lens surrounded by a closed reflective barrier wall.

FIG. 2A schematically illustrates a plurality of light sources disposed on a carrier 10 and a lens plate 100 disposed on the carrier 10. A lens 120 covers a light source 11, said lens 120 having a convex outer surface 121 and a concave inner surface 122. A combination of the light source 11 and the lens 120 generates a light beam having a solid angle Ω. As shown in FIG. 2A, a solid angle Ω is a measure of the amount of the field of view from some particular point that a given object covers. The point from which the object is viewed is called the apex of the solid angle, and the object is said to subtend its solid angle from that point. In the International System of Units (SI), a solid angle Ω is expressed in a dimensionless unit called a steradian (sr). One steradian corresponds to one unit of area on the unit sphere surrounding the apex. In particular, the solid angle Ω of a cone with its apex at the apex of the solid angle Ω, and with apex angle 2θ, is the area of a spherical cap on a unit sphere equal to $\Omega=2\pi(1-\cos\theta)=4\pi\sin^2(\theta/2)$. As shown in FIG. 2B, the reflective surface 213 is configured for reducing the solid angle Ω of light beams emitted through the lens 120. The reflective surface 213 may be configured for reducing the solid angle Ω from a first solid angle Ω1 between a predetermined solid angle and 2π sr to a second solid angle Ω2 smaller than 7π/4 sr, preferably smaller than 5π/3 sr, more preferably smaller than 3π/2 sr. By definition, a solid angle Ω=2π (sr corresponds to a half sphere. A solid angle Ω=7π/4 sr corresponds to a half apex angle θ=82.8° of a cone, a solid angle Ω=5π/3 sr corresponds to a half apex angle θ=80.4° of a cone, and a solid angle Ω=3π/2 sr corresponds to a half apex angle θ=75.5° of a cone. The predetermined solid angle may be larger than 3π/2 sr, preferably larger than 5π/3 sr, more preferably larger than 7π/4 sr.

As illustrated in FIGS. 2A and 2B, the height H (see FIG. 2B) of the closed reflective barrier wall 210 may be between 30% and 150% of a height H" (see FIG. 2A) of the associated lens 120, preferably between 60% and 120%, most preferably between 70% and 110%. In another embodiment, the height of the closed reflective barrier wall 210 may be larger than a height H" of the associated lens 120, preferably larger than 110% of said height H". The height H" of a lens 120 corresponds to the distance between a plane including the upper surface of the flat portion 110 and the highest point of a lens 120. Preferably, the distance between two adjacent light sources is smaller than 60 mm, more preferably smaller than 50 mm, most preferably smaller than 40 mm. Typically the distance between two adjacent light sources will be larger than 20 mm. Preferably, the height H of the closed reflective barrier wall 210 is smaller than 10 mm, more preferably smaller than 8 mm, most preferably smaller than 7 mm. In addition, said height H is at least 2 mm, preferably at least 3 mm. Although not illustrated in FIGS. 1A and 1B, the height H of the closed reflective barrier wall 210 may be variable along the second closed line L2 (see FIG. 7B).

In the embodiment of FIGS. 1A and 1B, the light emitting device 1 comprises 24 light sources 11 disposed on the carrier 10. Accordingly, three lens plates 100*a*, 100*b*, 100*c* comprise each 8 lenses 120, forming a total of 24 lenses 120, each lens 120 covering one light source 11. Hence, it is noted that instead of providing one lens plate 100 with 24 lenses 120, it is also possible to provide a plurality of lens plates with less lenses, e.g. 6 lens plates with each 4 lenses or 3 lens plates 100*a*, 100*b*, 100*c* with each 8 lenses 120 as illustrated in FIGS. 1A and 1B. Each light source 11 may comprise several LEDs. The 24 lenses 120 are aligned into 6 rows R and 4 columns C (6×4) to form a two-dimensional array of lenses 120. However, it should be clear for the skilled person that the number of light sources and/or the number of lenses may vary in other embodiments. It should also be clear for the skilled person that other arrangements of lenses may be envisaged in other embodiments. In a first exemplary embodiment, the lens plate may comprise 4 lenses 120 aligned into 2 rows R and 2 columns C (2×2). In a second exemplary embodiment, the lens plate may comprise 6 lenses 120 aligned into 2 rows R and 3 columns C (2×3), or 3 rows R and 2 columns C (3×2). In yet a third exemplary embodiment, the lens plate may comprise 9 lenses 120 aligned into 3 rows R and 3 columns C (3×3). Many other embodiments may be envisaged, such as (2×4), (3×4) arrangements of lenses, etc. In yet other embodiments, the lens plate may comprise more than 24 lenses.

In the embodiment of FIGS. 1A and 1B, the light shielding structure 200 comprises three light shielding modules 200*a*, 200*b*, 200*c*. Each light shielding module 200*a*, 200*b*, 200*c* comprises 8 interconnected closed reflective barrier walls 210. Optionally, the light shielding modules 200*a*, 200*b* are interconnected, and the light shielding modules 200*b*, 200*c* are interconnected. However, it should be clear for the skilled person that the number of closed reflective barrier walls 210 of a light shielding module 200*a*, 200*b*, 200*c*, and the number of light shielding modules 200*a*, 200*b*, 200*c* may vary in other embodiments. In a first exemplary embodiment, only a limited number of closed reflective barrier wall 210 may be present, resulting in a first glare reduction compared to a situation wherein the light emitting device 1 does not comprise any light shielding structure 200. In a second exemplary embodiment, one light shielding module may be present, resulting in a further glare reduction. In a third exemplary embodiment, two light shielding modules may be present, resulting in an even further glare reduction. In the embodiment illustrated in FIGS. 1A and 1B, three light shielding modules 200*a*, 200*b*, 200*c* are present, resulting in a highest glare reduction. Note that the above-mentioned different glare reductions may correspond to different G/G* classifications.

In the embodiment of FIGS. 1A and 1B, the 24 lenses 120 are 24 non-rotation symmetric lenses 120 having a lens symmetry plane Pl substantially perpendicular to the flat portion 110. However, it should be clear for the skilled person that in other embodiments at least one lens may be a rotation-symmetric lens, such as a hemispherical lens or an ellipsoidal lens having a major symmetry plane and a minor symmetry plane. In another embodiment, at least one lens may have no symmetry. In yet another embodiment at least one lens may be a free-form lens. The term "free-form" typically refers to non-rotational symmetric lenses. In the embodiment of FIGS. 1A and 1B, the 4 columns C are formed along the lens symmetry plane Pl. The reflective surface 213 of the 24 closed reflective barrier walls 210 is surrounding one associated lens of the 24 lenses 120 belonging to one column of said 4 columns C. However, it should be clear for the skilled person that in other embodiments, such as in FIGS. 5A and 5B, the reflective surface 213 of at least one closed reflective barrier wall of the plurality of closed reflective barrier walls 210 may be surrounding more than one associated lens of the plurality of lenses 120 belonging to one column of said plurality of columns C, and/or belonging to adjacent rows of said plurality of rows R.

As illustrated in FIGS. 1A and 1B, each light shielding module 200*a*, 200*b*, 200*c* further comprises a connecting means 220, preferably disposed on said flat portion 110 between the 2 rows R. More generally, a light shielding structure may comprise any number of light shielding modules, and each light shielding module may comprise any number of interconnected closed reflective barrier walls. In addition, multiple light shielding modules may be integrated in one piece which can be easily divided as a function of the amount of light shielding modules needed in the light emitting device. The material of the light shielding structure 200 may comprise plastic. Preferably, the plastic used for manufacturing the light shielding structure 200 is a white and opaque plastic, but plastic of a different color and/or partially translucent plastic may be envisaged. The light shielding structure 200 may also comprise other materials than plastic. The light shielding structure 200 may be covered with white painting or with painting of a different color, or with a reflective coating. In an embodiment, a surface roughness of the reflective surface 213 may correspond to any one of a coarse surface finish, a polished surface finish, or a combination thereof. The surface roughness may be the same for the reflective surface 213 of each closed reflective barrier wall 210, or may be different from one closed reflective barrier wall 210 to another.

In the embodiment of FIGS. 1A and 1B, the plurality of closed reflective barrier walls 210 and the connecting means 220 are integrally formed. In other embodiments, the plurality of closed reflective barrier walls 210 may be formed in one or more first pieces, and the connecting means 220 may be formed in one or more second pieces independently from the one or more first pieces. The light shielding structure 200 may be mounted on the lens plate 100 by means of releasable fastening elements. Said releasable fastening elements may comprise any one or more of the following elements: screws, locks, clamps, clips, or a combination thereof. The connecting means 220 may be provided with holes Ho, and the releasable fastening elements may be located into the holes Ho. In another embodiment, a hole or channel may be arranged in the lens plate, into which the light shielding structure 200 may be clipped or slid. In yet another embodiment, the light shielding structure 200 may be integrally formed with the lens plate. In yet another embodiment, the light shielding structure may be a perforated thick plate, preferably a perforated thick white and opaque plastic plate, wherein the holes correspond to the closed reflective barrier walls.

Figure 3:
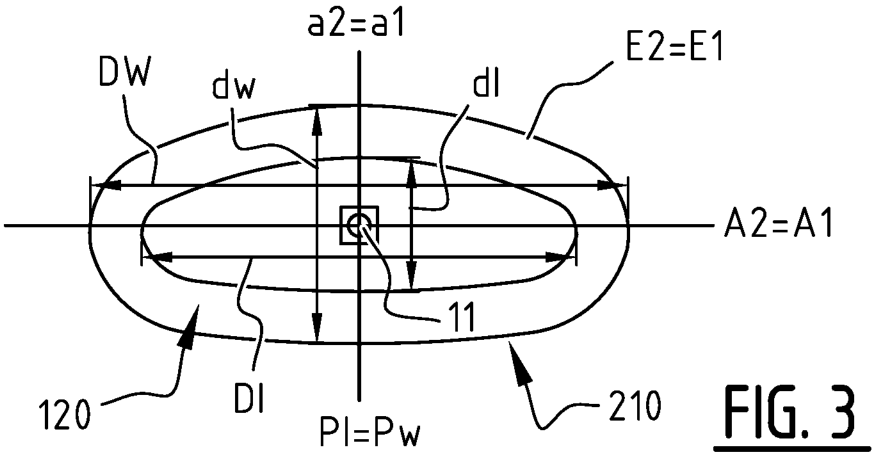
FIG. 3 shows a schematic top view of an exemplary embodiment of a light source and a lens surrounded by a closed reflective barrier wall.

FIG. 3 shows a schematic top view of an exemplary embodiment of a light source and a lens surrounded by a closed reflective barrier wall.

As illustrated in the embodiments of FIGS. 1A, 1B, and 3, the closed reflective barrier wall 210 has a wall symmetry plane Pw substantially perpendicular to the flat portion 110. The lens symmetry plane Pl coincides with the wall symmetry plane Pw. In other embodiments, such as that illustrated in FIG. 4C, the lens symmetry plane Pl may not coincide with the wall symmetry plane Pw, but may be substantially parallel to the wall symmetry plane Pw. In yet other embodiments, such as that illustrated in FIG. 4D, the lens symmetry plane Pl may neither coincide with, nor be substantially parallel to, the wall symmetry plane Pw.

As illustrated in FIGS. 1A, 1B, and 3, a dimension dw of the closed reflective barrier wall 210 along the wall symmetry plane Pw is greater than a dimension dl of the lens 120 along the lens symmetry plane Pl, preferably by maximum 50% of said dimension dl. A dimension Dw of the closed reflective barrier wall 210 in a direction perpendicular to the wall symmetry plane Pw is greater than a dimension Dl of the lens 120 in a direction perpendicular to the lens symmetry plane Pl, preferably by maximum 50% of said dimension Dl. A projection of the first closed line L1 on a plane parallel to the flat portion 110 is a first ellipse E1, and a projection of the second closed line L2 on said plane is a second ellipse E2. The first ellipse E1 has a minor axis a1 substantially parallel to the lens symmetry plane Pl, and the second ellipse E2 has a minor axis a2 substantially parallel to the lens symmetry plane Pl. In the embodiments of FIGS. 1A, 1B, and 3, the minor axis a1 of the first ellipse E1 coincides with the minor axis a2 of the second ellipse E2, and a major axis A1 of the first ellipse E1 perpendicular to the minor axis a1 of the first ellipse E1 coincides with a major axis A2 of the second ellipse E2 perpendicular to the minor axis a2 of the second ellipse E2. In other embodiments, such as that illustrated in FIG. 6E, the minor axis a1 of the first ellipse E1 may not coincide with the minor axis a2 of the second ellipse E2, and the major axis A1 of the first ellipse E1 may coincide with the major axis A2 of the second ellipse E2. In yet other non-illustrated embodiments, the minor axis a1 of the first ellipse E1 may coincide with the minor axis a2 of the second ellipse E2, and the major axis A1 of the first ellipse E1 may not coincide with the major axis A2 of the second ellipse E2, or the minor axis a1 of the first ellipse E1 may not coincide with the minor axis a2 of the second ellipse E2, and the major axis A1 of the first ellipse E1 may not coincide with the major axis A2 of the second ellipse E2.

In the embodiments of FIGS. 1A, 1B, and 3, a surface area delimited by the first ellipse E1 is equal to a surface area delimited by the second ellipse E2, and the reflective surface 213 is a cylindrical surface. In other embodiments, such as those illustrated in FIGS. 6C and 6D, the surface area delimited by the first ellipse E1 may be different from the surface area delimited by the second ellipse E2, and the reflective surface 213 may be a conical surface.

FIGS. 4A-4H respectively show a schematic top view of eight exemplary embodiments of a light source and a lens surrounded by a closed reflective barrier wall.

As illustrated in the embodiments of FIG. 4A-4H, a lens 120 of the plurality of lenses covers a light source 11 of the plurality of light sources. A closed reflective barrier wall 210 of the plurality of closed reflective barrier walls surrounds the lens 120. The interior bottom edge (not shown) defines a first closed line and the interior top edge (not shown) defines a second closed line, said first closed line and said second closed line comprising at least one curved portion over at least 15%, preferably over at least 20%, more preferably over at least 25%, of a perimeter of said first closed line and a perimeter of said second closed line, respectively.

Figure 4A:
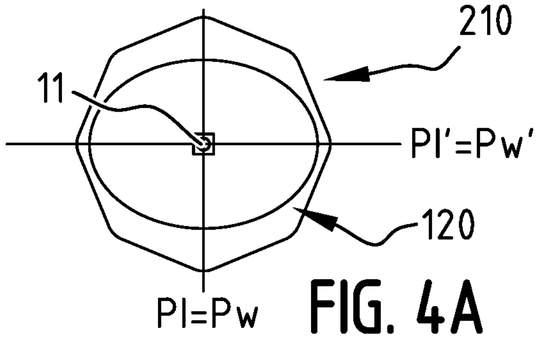
FIGS. 4A-4H respectively show a schematic top view of eight exemplary embodiments of a light source and a lens surrounded by a closed reflective barrier wall.
Figure 4B:
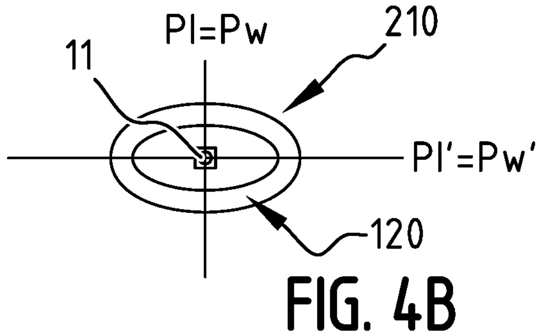
Figure 4C:
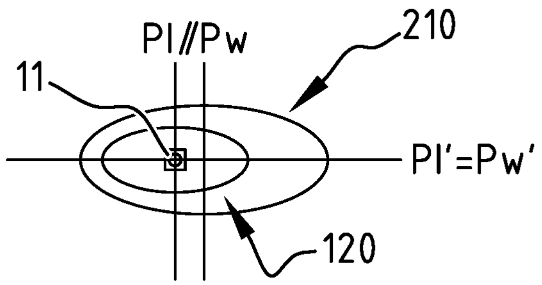
Figure 4D:
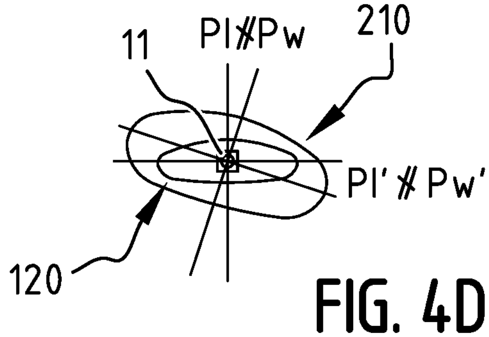
Figure 4E:
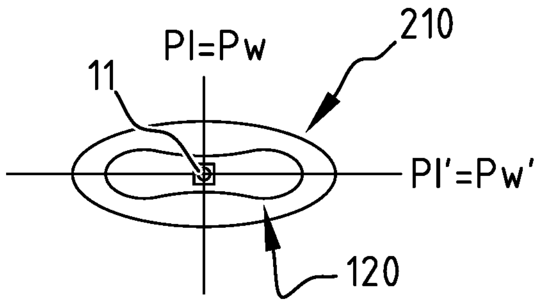
Figure 4F:
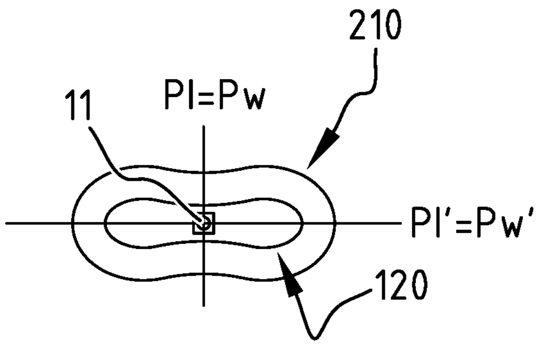
Figure 4G:
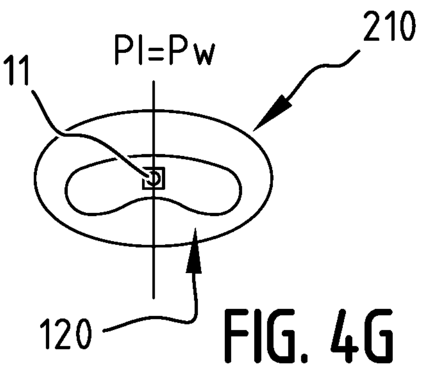
Figure 4H:
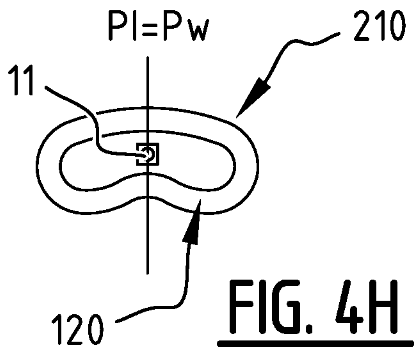

As illustrated in FIGS. 4A-4H, the lens 120 is a non-rotation symmetric lens 120 having a lens symmetry plane Pl substantially perpendicular to the flat portion of the lens plate (not shown). In the embodiments of FIGS. 4A-4F, the lens 120 has a further lens symmetry plane Pl' substantially perpendicular to the flat portion and to the lens symmetry plane Pl. In the embodiments of FIGS. 4G and 4H, the lens 120 has only the lens symmetry plane Pl. It should be clear for the skilled person that the geometry of the lens 120 is not limited to the geometry described in the embodiments of FIGS. 4A-4H, and that other geometries of the lens 120 may be considered. For example, a lens with no symmetry plane or no symmetry axis may be envisaged.

As illustrated in FIGS. 4A-4H, the closed reflective barrier wall 210 has a wall symmetry plane Pw substantially perpendicular to the flat portion of the lens plate (not shown). In the embodiments of FIGS. 4A-4F, the closed reflective barrier wall 210 has a further wall symmetry plane Pw substantially perpendicular to the flat portion and to the wall symmetry plane Pw. In the embodiments of FIGS. 4G and 4H, the closed reflective barrier wall 210 has only the wall symmetry plane Pw. It should be clear for the skilled person that the geometry of the closed reflective barrier wall 210 is not limited to the geometry described in the embodiments of FIGS. 4A-4H, and that other geometries of the closed reflective barrier wall 210 may be considered. For example, a closed reflective barrier wall with no symmetry plane or no symmetry axis may be envisaged.

As illustrated in FIGS. 4A-4H, a dimension of the closed reflective barrier wall 210 along the wall symmetry plane Pw is greater than a dimension of the lens 120 along the lens symmetry plane Pl, preferably by maximum 50% of said dimension. A dimension of the closed reflective barrier wall 210 in a direction perpendicular to the wall symmetry plane Pw, i.e., along the further wall symmetry plane Pw', is greater than a dimension of the lens 120 in a direction perpendicular to the lens symmetry plane Pl, i.e., along the further lens symmetry plane Pl', preferably by maximum 50% of said dimension.

In the embodiments of FIGS. 4B, 4C, 4F, and 4H, the shape (or geometry) of the closed reflective barrier wall 210 substantially follows the shape (or geometry) of the lens 120. In the embodiments of FIGS. 4B, 4C, 4F, and 4H, a curvature in a direction parallel to the lens symmetry plane Pl of the first closed line and/or the second closed line is substantially equal to a curvature in said direction of a projection of the lens 120 perpendicular to the flat portion. For example, when the curvature in the direction parallel to the lens symmetry plane Pl of said projection of the lens 120 is convex (concave), the curvature in said direction of the first closed line and/or the second closed line is also convex (concave). Further, in the embodiments of FIGS. 4B, 4C, and 4F a curvature in a direction perpendicular to the lens symmetry plane Pl of the first closed line and/or the second closed line is substantially equal to a curvature in said direction of a projection of the lens 120 perpendicular to the flat portion. For example, when the curvature in the direction perpendicular to the lens symmetry plane Pl of said projection of the lens 120 is convex (concave), the curvature in said direction of the first closed line and/or the second closed line is also convex (concave). By contrast, in the embodiments of FIGS. 4A, 4D, 4E, and 4G the shape (or geometry) of the closed reflective barrier wall 210 does not substantially follow the shape (or geometry) of the lens 120.

In the embodiment of FIG. 4A, the first closed line and the second closed line of the closed reflective barrier wall 210 comprise 8 flat portions and 8 curved portions over at least 15%, preferably over at least 20%, more preferably over at least 25%, of a perimeter of said first closed line and a perimeter of said second closed line, respectively. The 8 curved portions join said 8 flat portions, as an octagon with rounded corners. Hence, the reflective surface (not visible) of the closed reflective barrier wall 210 comprises flat and curved surfaces. In the embodiments of FIGS. 4B-4H, the first closed line and the second closed line of the closed reflective barrier wall 210 only comprise curved portions over the entire perimeter of said first closed line and the entire perimeter of said second closed line, respectively. Hence, the reflective surface (not visible) of the closed reflective barrier wall 210 only comprises curved surfaces.

The embodiment of FIG. 4B corresponds to the embodiments of FIGS. 1A, 1B, and 3, and the description related to FIGS. 1A, 1B, and 3 also applies to FIG. 4B and will not be repeated here. In the embodiment of FIG. 4C, the lens symmetry plane Pl does not coincide with the wall symmetry plane Pw, but is substantially parallel to the wall symmetry plane Pw. In the embodiment of FIG. 4D, the lens symmetry plane Pl neither coincides with, nor is substantially parallel to, the wall symmetry plane Pw.

In the embodiments of FIGS. 4E-4H, the lens 120 comprises convex and concave curved outer and/or inner surfaces. In other embodiments, the inner surface may be concave or convex, and the outer surface may be flat, and vice versa. In the embodiments of FIGS. 4F and 4H, the reflective surface (not visible) of the closed reflective barrier wall 210 comprises convex and concave curved surfaces. In the embodiments of FIGS. 4E and 4G, the reflective surface (not visible) of the closed reflective barrier wall 210 only comprises concave curved surfaces, as in the embodiments of FIGS. 4B-4D.

Figure 5A:
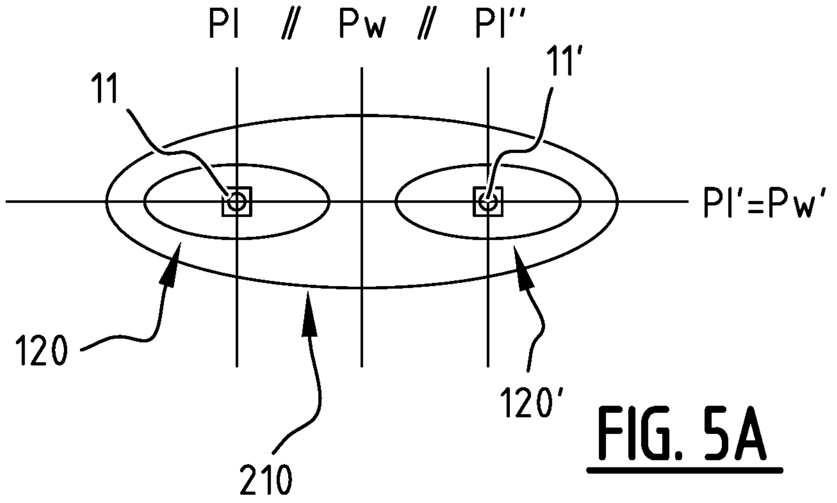
FIGS. 5A and 5B respectively show a schematic top view of two exemplary embodiments of two light sources and two lenses surrounded by a closed reflective barrier wall.
Figure 5B:
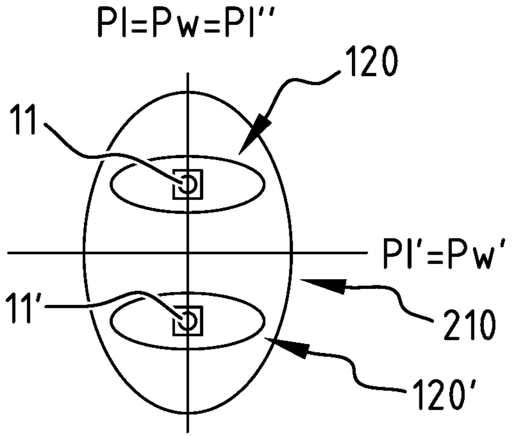

FIGS. 5A and 5B respectively show a schematic top view of two exemplary embodiments of two light sources and two lenses surrounded by a closed reflective barrier wall.

In contrast to FIGS. 1-4H, in FIGS. 5A and 5B the reflective surface (not visible) of at least one closed reflective barrier wall of the plurality of closed reflective barrier walls 210 may be surrounding more than one associated lens of the plurality of lenses 120.

In the embodiment of FIG. 5A, two non-rotation symmetric lenses 120, 120' respectively cover two light sources 11, 11', and respectively have a lens symmetry plane Pl, Pl'' substantially perpendicular to the flat portion of the lens plate (not shown). The lens symmetry plane Pl is substantially parallel to the lens symmetry plane Pl''. The closed reflective barrier wall has a wall symmetry plane Pw substantially perpendicular to the flat portion of the lens plate. The wall symmetry plane Pw is substantially parallel to the lens symmetry planes Pl, Pl''. The reflective surface (not visible) may comprise any one of a flat surface, a concave surface, a convex surface, or a combination thereof. In the embodiment of FIG. 5A, the first closed line and the second closed line of the closed reflective barrier wall 210 only comprise curved portions over the entire perimeter of said first closed line and the entire perimeter of said second closed line, respectively. Hence, the reflective surface of the closed reflective barrier wall 210 only comprises curved surfaces. A projection of the first closed line on a plane parallel to the flat portion may be a first ellipse, and a projection of the second closed line on said plane may be a second ellipse.

In the embodiment of FIG. 5B, two non-rotation symmetric lenses 120, 120' respectively cover two light sources 11, 11', and have in common a lens symmetry plane Pl substantially perpendicular to the flat portion of the lens plate (not shown), i.e., the lens symmetry plane Pl coincides with the lens symmetry plane Pl''. The closed reflective barrier wall has a wall symmetry plane Pw substantially perpendicular to the flat portion of the lens plate. The wall symmetry plane Pw coincides with the lens symmetry plane Pl. The reflective surface (not visible) may comprise any one of a flat surface, a concave surface, a convex surface, or a combination thereof. In the embodiment of FIG. 5B, the first closed line and the second closed line of the closed reflective barrier wall 210 only comprise curved portions over the entire perimeter of said first closed line and the entire perimeter of said second closed line, respectively. Hence, the reflective surface of the closed reflective barrier wall 210 only comprises curved surfaces. A projection of the first closed line on a plane parallel to the flat portion may be a first ellipse, and a projection of the second closed line on said plane may be a second ellipse.

In the embodiments of FIGS. 5A and 5B, a dimension of the closed reflective barrier wall 210 along the wall symmetry plane Pw is greater than a dimension of the lenses 120, 120' along the lens symmetry planes Pl, Pl'', preferably by maximum 50% of said dimension. A dimension of the closed reflective barrier wall 210 in a direction perpendicular to the wall symmetry plane Pw is greater than a dimension of the lenses 120, 120' in a direction perpendicular to the lens symmetry planes Pl, Pl'', preferably by maximum 50% of said dimension. In such embodiments, where a closed reflective barrier wall 210 is surrounding more than one associated lens 120, 120', said dimension along the lens symmetry planes Pl, Pl'' corresponds to the sum of the dimensions of the associated lenses 120, 120' along the lens symmetry planes Pl, Pl", and said dimension perpendicular to the lens symmetry planes Pl, Pl" corresponds to the sum of the dimensions of the associated lenses 120, 120' perpendicular to the lens symmetry planes Pl, Pl".

FIGS. 6A-6F respectively show a schematic perspective view of six exemplary embodiments of a closed reflective barrier wall for use in a light emitting device.

As illustrated in FIGS. 6A-6F, the closed reflective barrier wall 210 comprises an interior bottom edge 211 disposed on a flat portion of a lens plate (not shown), a interior top edge 212 at a height H above the flat portion, and a reflective surface 213 connecting the interior bottom edge 211 and the interior top edge 212 and surrounding one or more associated lenses (not shown). The interior bottom edge 211 defines a first closed line L1 and the interior top edge 212 defines a second closed line L2, said first closed line L1 and said second closed line L2 comprising at least one curved portion over at least 15%, preferably over at least 20%, more preferably over at least 25%, of a perimeter of said first closed line L1 and a perimeter of said second closed line L2, respectively. The reflective surface 213 of the closed reflective barrier wall 210 may comprise any one of a concave surface, a convex surface, a flat surface, or a combination thereof. The reflective surface 213 is configured for reducing a solid angle $\Omega$ of light beams emitted through the one or more associated lenses of the plurality of lenses. The reflective surface 213 may be configured for reducing said solid angle $\Omega$ from a first solid angle $\Omega 1$ between a predetermined solid angle and $2\pi$ sr to a second solid angle $\Omega 2$ smaller than $7\pi/4$ sr, preferably smaller than $5\pi/3$ sr, more preferably smaller than $3\pi/2$ sr. The predetermined solid angle may be larger than $3\pi/2$ sr, preferably larger than $5\pi/3$ sr, more preferably larger than $7\pi/4$ sr.

Preferably, an angle between an axis perpendicular to the flat portion and an axis tangent to the reflective surface 213 is comprised between 0° and 20°, more preferably between 0° and 15°. In an example, said angle may be substantially 0°, i.e., the axis tangent to the reflective surface 213 may be substantially parallel to the axis perpendicular to the flat portion. In other words, the reflective surface 213 may be oriented substantially vertically, i.e., substantially perpendicular to the flat portion. In another example, said angle may be not null, i.e., the axis tangent to the reflective surface 213 may be inclined with respect to the axis perpendicular to the flat portion. In other words, the reflective surface 213 may be oblique, i.e., may not be substantially perpendicular to the flat portion but may be inclined with respect to the flat portion. It should be clear for the skilled person that embodiments illustrating other combinations of surfaces of the reflective surface 213 may be envisaged. The reflective surface 213 may be covered with white painting or with painting of a different color, or with a reflective coating. In an embodiment, a surface roughness of the reflective surface 213 may correspond to any one of a coarse surface finish, a polished surface finish, or a combination thereof.

Figure 6A:
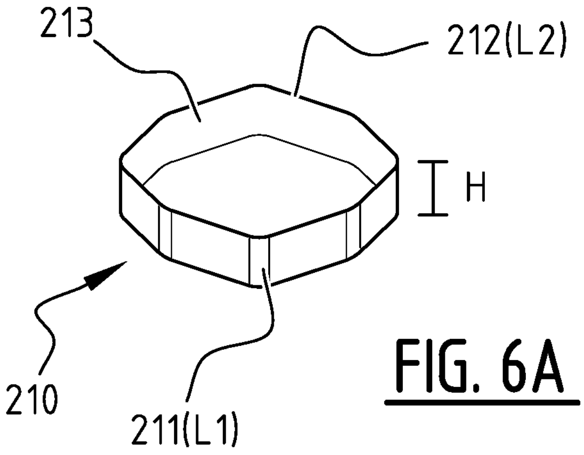
FIGS. 6A-6F respectively show a schematic perspective view of six exemplary embodiments of a closed reflective barrier wall for use in a light emitting device.

The embodiment of FIG. 6A corresponds to the embodiments of FIG. 4A, and the description related to FIG. 4A also applies to FIG. 6A and will not be repeated here.

Figure 6B:
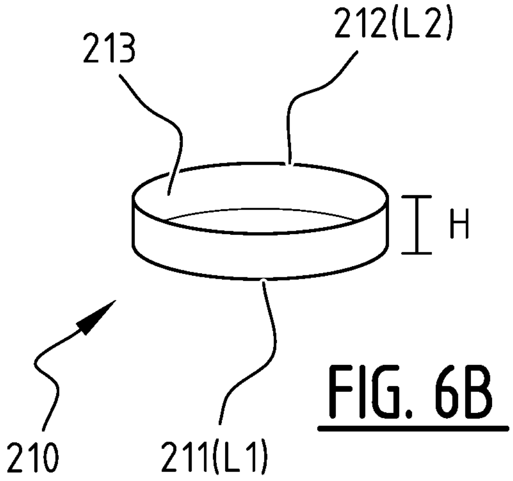

The embodiment of FIG. 6B corresponds to the embodiments of FIGS. 1A, 1B, 3, and 4B, and the description related to FIGS. 1A, 1B, 3 and 5B also applies to FIG. 6B and will not be repeated here.

Figure 6C:
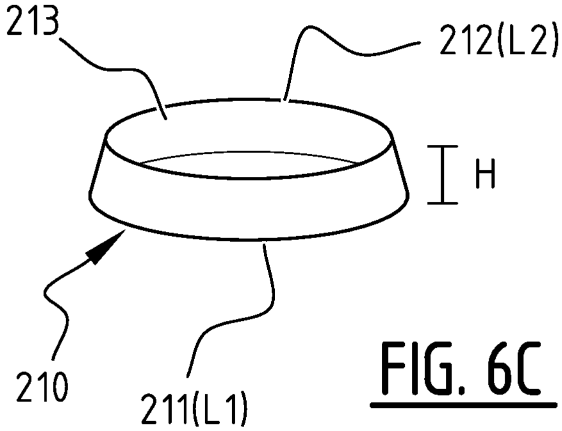
Figure 6D:
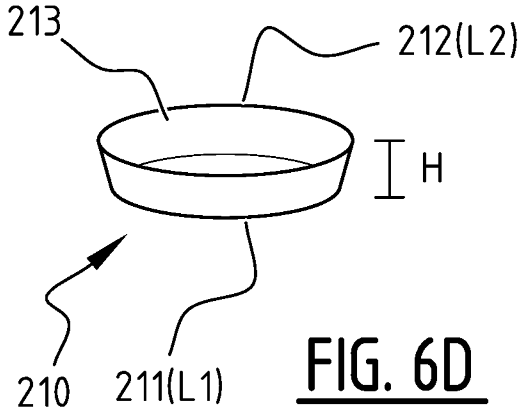

In the embodiments of FIGS. 6C and 6D, a projection of the first closed line L1 on a plane parallel to the flat portion may be a first ellipse, and a projection of the second closed line L2 on said plane may be a second ellipse. The surface area delimited by the first ellipse may be different from the surface area delimited by the second ellipse, and the reflective surface 213 may be a conical surface, in contrast to the embodiment of FIG. 6B where the surface area delimited by the first ellipse is equal to a surface area delimited by the second ellipse, and the reflective surface 213 is a cylindrical surface. In the embodiment of FIG. 6C, the surface area delimited by the second ellipse is smaller than the surface area delimited by the first ellipse, whereas in the embodiment of FIG. 6D the surface area delimited by the second ellipse is larger than that of the first ellipse.

Figure 6E:
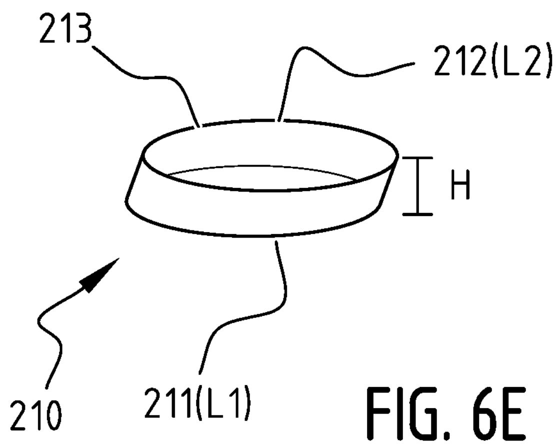

In the embodiment of FIG. 6E, the minor axis (not shown) of the first ellipse does not coincide with the minor axis (not shown) of the second ellipse, and the major axis (not shown) of the first ellipse coincides with the major axis (not shown) of the second ellipse. In other embodiments, the minor axis of the first ellipse may coincide with the minor axis of the second ellipse, and the major axis of the first ellipse may not coincide with the major axis of the second ellipse, or the minor axis of the first ellipse may not coincide with the minor axis of the second ellipse, and the major axis of the first ellipse may not coincide with the major axis of the second ellipse. In FIG. 6E, the surface area delimited by the first ellipse is equal to the surface area delimited by the second ellipse. In other embodiments, the surface area delimited by the first ellipse may be different from the surface area delimited by the second ellipse.

Figure 6F:
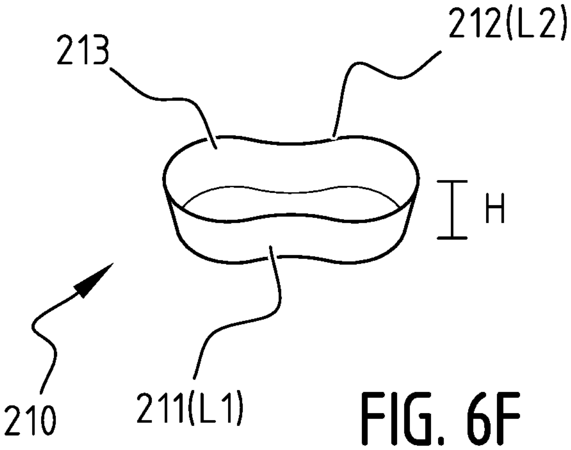

The embodiment of FIG. 6F corresponds to the embodiment of FIG. 4F, and the description related to FIG. 4F also applies to FIG. 6F and will not be repeated here.

Figure 7A:
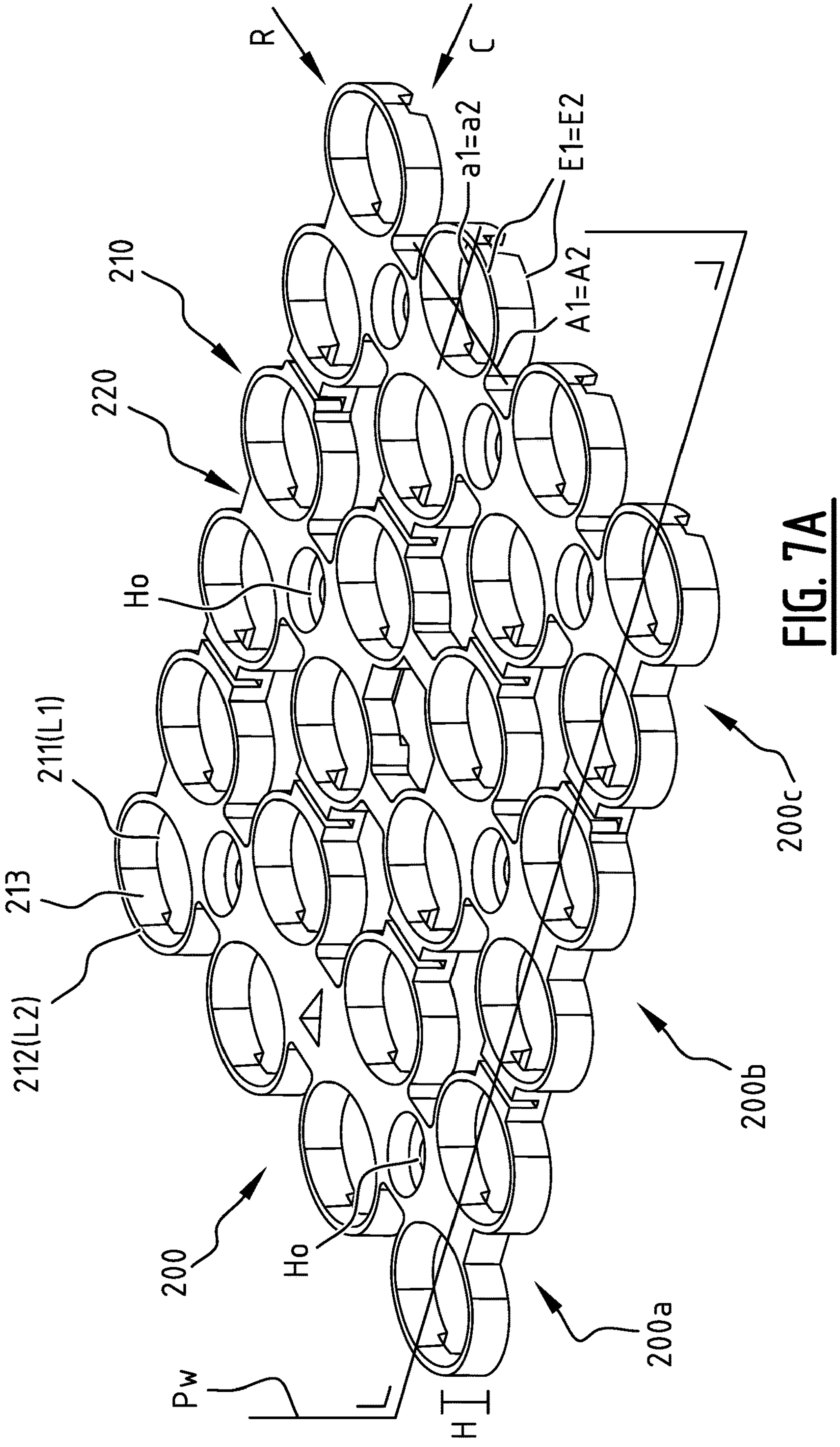
FIGS. 7A and 7B respectively show a perspective view of two exemplary embodiments of a light shielding structure for use in a light emitting device.
Figure 7B:
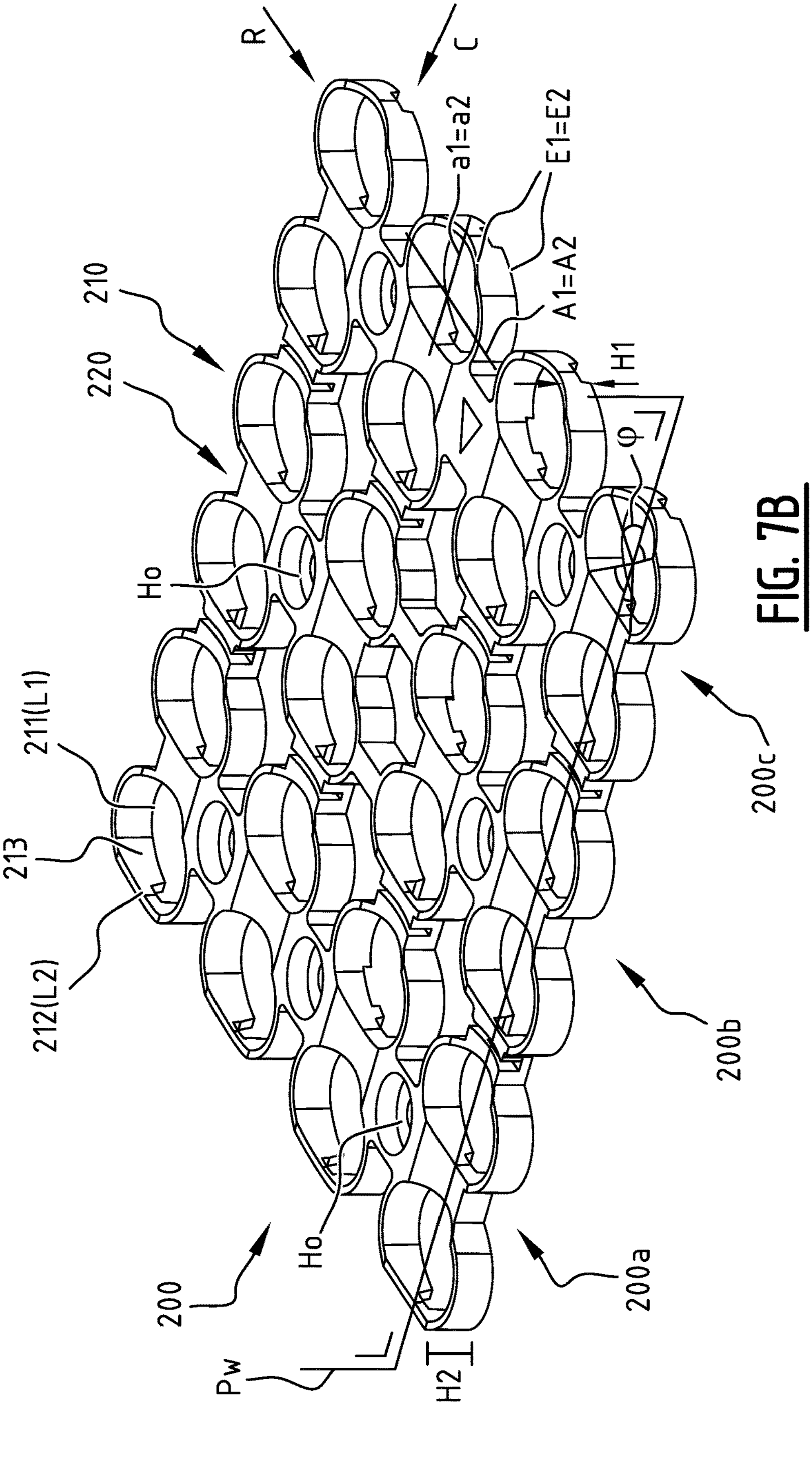

FIGS. 7A and 7B respectively show a perspective view of two exemplary embodiments of a light shielding structure for use in a light emitting device.

The embodiment of FIG. 7A corresponds to the embodiment of FIGS. 1A and 1B, and the description related to FIGS. 1A and 1B also applies to FIG. 7A and will not be repeated here.

In the embodiment of FIG. 7B, the height H of the closed reflective barrier walls 210 is variable along the second closed line L2. For selected values of the azimuthal angle $\varphi$, referring to the spherical coordinate system $(r, \theta, \varphi)$, the height H1 of the plurality of closed reflective barrier walls 210 is smaller than the height H2 of said plurality of closed reflective barrier walls 210 for other values of $\varphi$. Said selected values of $\varphi$ may depend on the geometry of the plurality of lenses (not shown), i.e., on the geometry of light beams emitted through said plurality of lenses.

As illustrated in FIG. 7B, the values of the azimuthal angle $\varphi$ are given relative to the wall symmetry plane Pw of the plurality of closed reflective barrier walls 210. A value of 9 equal to 0° or 180° corresponds to a direction along the wall symmetry plane Pw, while a value of 9 equal to 90° or 270° corresponds to a direction perpendicular to the wall symmetry plane Pw.

As illustrated in FIG. 7B, for values of $\varphi$ between 315° (or −45°) and 45° and between 135° and 225° the height H1 of the plurality of closed reflective barrier walls 210 is smaller than the height H2 of said plurality of closed reflective barrier walls 210, reaching a minimal height H1 for $\varphi$=0° and $\varphi$=180°. Said minimal height H1 is larger than 2 mm, preferably larger than 3 mm. It should be clear for the skilled person that in other non-illustrated embodiments the values of $\varphi$ for which the height H1 of the plurality of closed reflective barrier walls 210 is smaller than the height H2 of said plurality of closed reflective barrier walls 210 may vary. In another embodiment, said values may range between 45° and 135° and/or between 225° and 315°. In yet another embodiment, said values may range between 0° and 90° and/or between 180° and 270°, or between 270° and 0° and/or between 90° and 180°. In those other exemplary embodiments, the minimal height H1 is larger than 2 mm, preferably larger than 3 mm.

Figure 8:
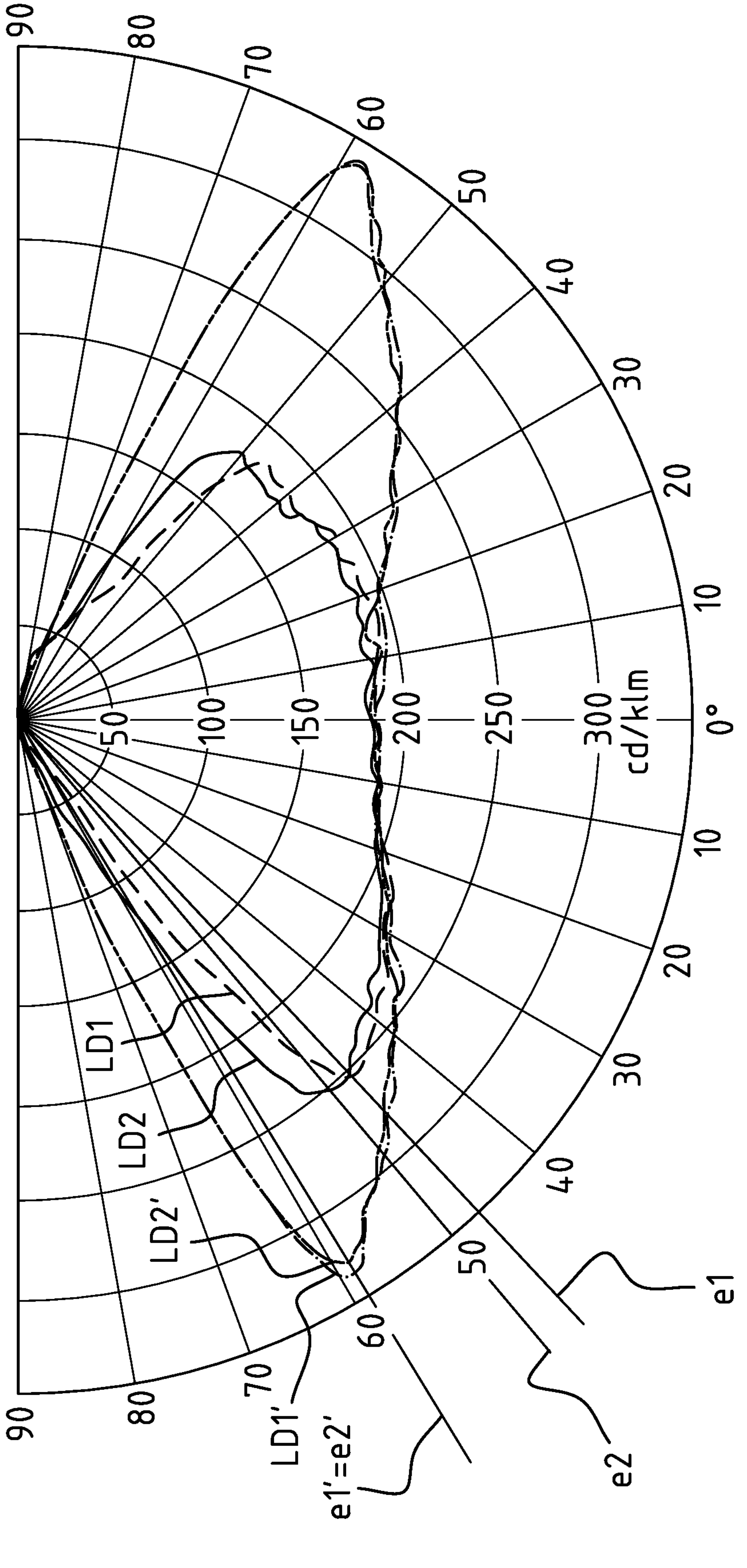
FIG. 8 illustrates a polar diagram of the light distribution according to two exemplary embodiments of a light emitting device comprising a light shielding structure.

FIG. 8 illustrates a polar diagram of the light distribution according to two exemplary embodiments of a light emitting device comprising a light shielding structure.

The first exemplary embodiment corresponds to the embodiment of FIG. 7A, while the second exemplary embodiment corresponds to the embodiment of FIG. 7B.

On the polar diagram of FIG. 8, LD1 and LD2 respectively show the light distribution at 90°-270°, i.e., in the lens symmetry plane Pl of FIGS. 1A and 1B, in the first embodiment and in the second embodiment. It can be seen from FIG. 8 that the shape of the light beam is slightly changed from the second embodiment to the first embodiment. The directions e1 and e2 respectively correspond to a maximum of the light distribution at 90°-270° in the first embodiment and in the second embodiment. It is observed in FIG. 8 that the maximal light intensity is kept constant from the second embodiment to the first embodiment. It is also observed in FIG. 8 that the angle corresponding to said maximum decreases from the second embodiment to the first embodiment. Finally, it is observed in FIG. 8 that the light intensity at large angles, that may correspond to glaring angles, also decreases from the second embodiment to the first embodiment.

On the polar diagram of FIG. 8, LD1' and LD2' respectively show the light distribution at 0°-180°, i.e., in a plane perpendicular to the lens plate 100 and to the lens symmetry plane Pl of FIGS. 1A and 1B, in the first embodiment and in the second embodiment. It can be seen from FIG. 8 that the shape of the light beam is slightly changed from the second embodiment to the first embodiment. The directions e1' and e2' respectively correspond to a maximum of the light distribution at 0°-180° in the first embodiment and in the second embodiment. It is observed in FIG. 8 that the maximal light intensity is kept constant from the second embodiment to the first embodiment. It is also observed in FIG. 8 that the angle corresponding to said maximum is kept constant from the second embodiment to the first embodiment.

Figure 9:
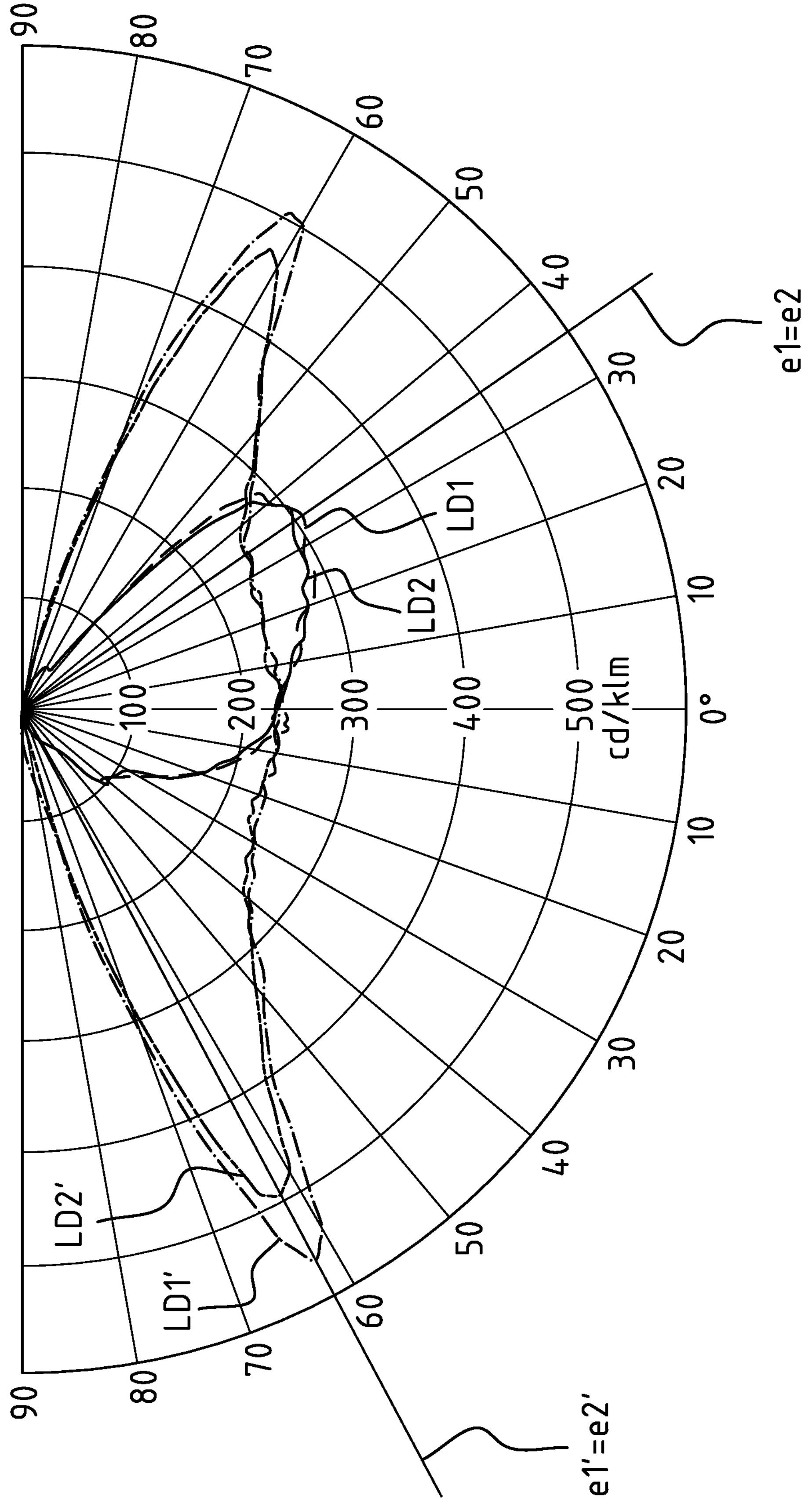
FIG. 9 illustrates a polar diagram of the light distribution according to two exemplary embodiments of a light emitting device comprising a light shielding structure.

FIG. 9 illustrates a polar diagram of the light distribution according to two exemplary embodiments of a light emitting device comprising a light shielding structure.

The first exemplary embodiment corresponds to the embodiment of FIG. 7A, while the second exemplary embodiment corresponds to a modified version of the embodiment of FIG. 7A, where the reflective surface 213 is inclined, i.e., substantially not perpendicular to the flat portion of the lens plate, as illustrated in FIG. 6D. In the second embodiment, the surface area delimited by the second ellipse is larger than that of the first ellipse, and the reflective surface 213 is a conical surface inclined with an angle of 15° with respect to an axis perpendicular to the flat portion of the lens plate.

On the polar diagram of FIG. 9, LD1 and LD2 respectively show the light distribution at 90°-270° in the first embodiment and in the second embodiment. It can be seen from FIG. 9 that the shape of the light beam is slightly changed from the second embodiment to the first embodiment. The directions e1 and e2 respectively correspond to a maximum of the light distribution at 90°-270° in the first embodiment and in the second embodiment. It is observed in FIG. 9 that the maximal light intensity is kept constant from the second embodiment to the first embodiment. It is also observed in FIG. 9 that the angle corresponding to said maximum is kept constant from the second embodiment to the first embodiment.

On the polar diagram of FIG. 9, LD1' and LD2' respectively show the light distribution at 0°-180° in the first embodiment and in the second embodiment. It can be seen from FIG. 9 that the shape of the light beam is slightly changed from the second embodiment to the first embodiment. The directions e1 and e2' respectively correspond to a maximum of the light distribution at 0°-180° in the first embodiment and in the second embodiment. It is observed in FIG. 9 that the maximal light intensity decreases from the second embodiment to the first embodiment. It is also observed in FIG. 9 that the angle corresponding to said maximum is kept constant from the second embodiment to the first embodiment. Finally, it is observed in FIG. 9 that the light intensity at large angles, that may correspond to glaring angles, decreases from the second embodiment to the first embodiment.

Figure 10:
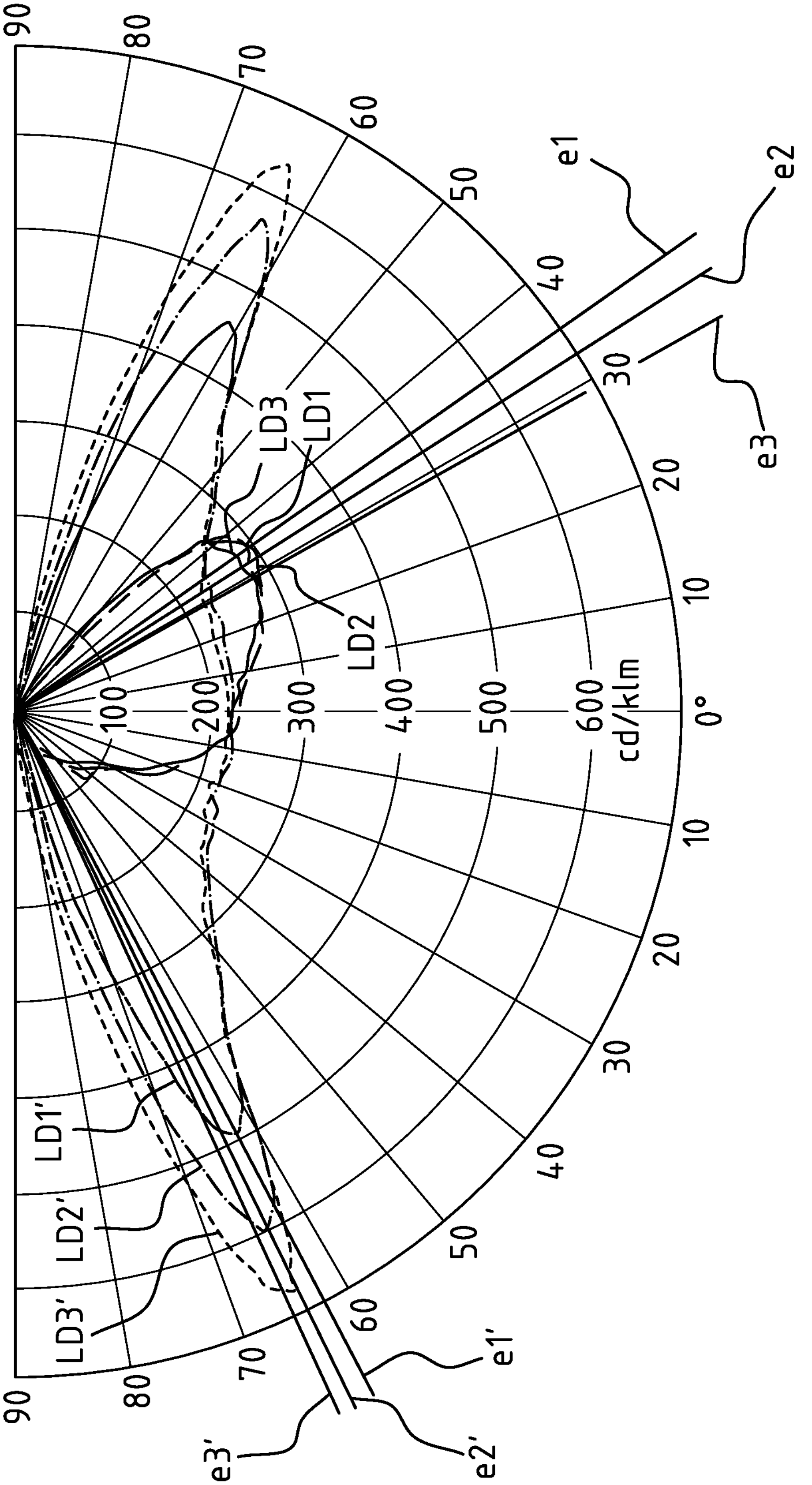
FIG. 10 illustrates a polar diagram of the light distribution according to three exemplary embodiments of a light emitting device comprising a light shielding structure.

FIG. 10 illustrates a polar diagram of the light distribution according to three exemplary embodiments of a light emitting device comprising a light shielding structure.

The first exemplary embodiment of FIG. 10 corresponds to the embodiment of FIG. 7A, while the second and the third exemplary embodiments of FIG. 10 correspond to modified versions of the embodiment of FIG. 7A. In the second embodiment of FIG. 10, only half of the closed reflective barrier walls 210 are present, i.e., 12 closed reflective barrier walls 210, whereas in the third embodiment of FIG. 10 no closed reflective barrier wall 210 is present.

On the polar diagram of FIG. 10, LD1, LD2, and LD3 respectively show the light distribution at 90°-270° in the first embodiment, in the second embodiment, and in the third embodiment. It can be seen from FIG. 10 that the shape of the light beam is slightly changed from the second embodiment to the first embodiment. The directions e1, e2, and e3 respectively correspond to a maximum of the light distribution at 90°-270° in the first embodiment, in the second embodiment, and in the third embodiment. It is observed in FIG. 10 that the maximal light intensity is slightly changed from the third embodiment to the first embodiment. It is also observed in FIG. 10 that the angle corresponding to said maximum slightly increases from the third embodiment to the first embodiment.

On the polar diagram of FIG. 10, LD1', LD2', and LD3' respectively show the light distribution at 0°-180° in the first embodiment, in the second embodiment, and in the third embodiment. It can be seen from FIG. 10 that the shape of the light beam is slightly changed from the third embodiment to the first embodiment. The directions e1, e2', and e3' respectively correspond to a maximum of the light distribution at 0°-180° in the first embodiment, in the second embodiment, and in the third embodiment. It is observed in FIG. 10 that the maximal light intensity decreases from the third embodiment to the first embodiment. It is also observed in FIG. 10 that the angle corresponding to said maximum decreases from the third embodiment to the first embodiment. Finally, it is observed in FIG. 10 that the light intensity at large angles, that may correspond to glaring angles, also decreases from the third embodiment to the first embodiment.

Whilst the principles of the invention have been set out above in connection with specific embodiments, it is to be understood that this description is merely made by way of example and not as a limitation of the scope of protection which is determined by the appended claims.

The invention claimed is:

1. A light emitting device comprising:

a carrier;

a plurality of light sources disposed on the carrier;

a lens plate disposed on the carrier, comprising a flat portion and a plurality of lenses covering the plurality of light sources; and a light shielding structure mounted on said lens plate, comprising a plurality of closed reflective barrier walls, each having an interior bottom edge disposed on said flat portion, an interior top edge at a height above said flat portion, and a reflective surface connecting the interior bottom edge and the interior top edge and surrounding one or more associated lenses of said plurality of lenses, wherein said height is at least 2 mm, wherein the interior bottom edge defines a first closed line and the interior top edge defines a second closed line, said first closed line and said second closed line comprising at least one curved portion over at least 15% of a perimeter of said first closed line and a perimeter of said second closed line, respectively, and wherein said reflective surface is configured for reducing a solid angle of light beams emitted through the one or more associated lenses of said plurality of lenses from a first solid angle between a predetermined solid angle and a sr to a second solid angle smaller than $7\pi/4$ sr.

2. The light emitting device according to claim 1, wherein the predetermined solid angle is larger than $3\pi/2$ sr.

3. The light emitting device according to claim 1, wherein the plurality of lenses is a plurality of lenses having a lens symmetry plane substantially perpendicular to the flat portion.

4. The light emitting device according to claim 3, wherein the plurality of closed reflective barrier walls has a wall symmetry plane substantially perpendicular to the flat portion, and wherein the lens symmetry plane is substantially parallel to the wall symmetry plane or coincides with the wall symmetry plane.

5. The light emitting device according to claim 4, wherein a projection of the first closed line on a plane parallel to the flat portion is a first ellipse, and a projection of the second closed line on said plane is a second ellipse, wherein the first ellipse has a minor axis substantially parallel to the lens symmetry plane, and wherein the second ellipse has a minor axis substantially parallel to the lens symmetry plane.

6. The light emitting device according to claim 5, wherein the minor axis of the first ellipse coincides with the minor axis of the second ellipse, and wherein a major axis of the first ellipse perpendicular to the minor axis of the first ellipse coincides with a major axis of the second ellipse perpendicular to the minor axis of the second ellipse.

7. The light emitting device according to claim 3, wherein the plurality of closed reflective barrier walls has a wall symmetry plane substantially perpendicular to the flat portion, wherein a dimension of the plurality of closed reflective barrier walls along the wall symmetry plane is greater than a dimension of the plurality of lenses along the lens symmetry plane, or wherein a dimension of the plurality of closed reflective barrier walls in a direction perpendicular to the wall symmetry plane is greater than a dimension of the plurality of lenses in a direction perpendicular to the lens symmetry plane.

8. The light emitting device according to claim 3, wherein a curvature in a direction parallel to the lens symmetry plane of the first closed line and/or the second closed line is substantially equal to a curvature in said direction of a projection of an associated lens perpendicular to the flat portion, or wherein a curvature in a direction perpendicular to the lens symmetry plane of the first closed line and/or the second closed line is substantially equal to a curvature in said direction of a projection of an associated lens perpendicular to the flat portion.

9. The light emitting device according to claim 1, wherein the plurality of closed reflective barrier walls has a wall symmetry plane substantially perpendicular to the flat portion.

10. The light emitting device according to claim 1, wherein the reflective surface comprises any one of a flat surface, a concave surface, a convex surface, or a combination thereof, or wherein a surface roughness of the reflective surface corresponds to any one of a coarse surface finish, a polished surface finish, or a combination thereof.

11. The light emitting device according to claim 1, wherein a projection of the first closed line on a plane parallel to the flat portion is a first ellipse, and a projection of the second closed line on said plane is a second ellipse.

12. The light emitting device according to claim 1, wherein the plurality of lenses is aligned into a plurality of rows and a plurality of columns to form a two-dimensional array of lenses.

13. The light emitting device according to claim 1, wherein the height of the plurality of closed reflective barrier walls is variable along the second closed line, or wherein the height of the plurality of closed reflective barrier walls is between 30% and 150% of a height of the plurality of lenses.

14. The light emitting device according to claim 1, wherein the light shielding structure further comprises a connecting means configured for connecting the plurality of closed reflective barrier walls.

15. The light emitting device according to claim 14, wherein the plurality of lenses is aligned into a plurality of rows and a plurality of columns to form a two-dimensional array of lenses, wherein the connecting means is disposed between two adjacent rows of said plurality of rows of lenses, or wherein the plurality of closed reflective barrier walls and the connecting means are integrally formed.

16. The light emitting device according to claim 14, wherein the light shielding structure is mounted on the lens plate by means of releasable fastening elements, and wherein the connecting means is provided with holes, and the releasable fastening elements are located into said holes.

17. The light emitting device according to claim 1, wherein a material of the light shielding structure comprises plastic, or wherein the lens plate is disposed on the carrier by screwing, locking, clamping, clipping, gluing, or a combination thereof, or wherein the plurality of light sources comprises light emitting diodes.

18. The light emitting device according to claim 1, wherein the light shielding structure is mounted on the lens plate by means of releasable fastening elements.

19. A light shielding structure for use in a light emitting device, wherein the light emitting device comprises a carrier, a plurality of light sources disposed on the carrier, a lens plate disposed on the carrier, comprising a flat portion and a plurality of lenses covering the plurality of light sources, and said light shielding structure mounted on said lens plate, said light shielding structure comprising a plurality of closed reflective barrier walls, each having an interior bottom edge disposed on said flat portion, an interior top edge at a height above said interior bottom edge, and a reflective surface connecting the interior bottom edge and the interior top edge and surrounding one or more associated lenses of said plurality of lenses, wherein said height is at least 2 mm, wherein the interior bottom edge defines a first closed line and the interior top edge defines a second closed line, said first closed line and said second closed line comprising at least one curved portion over at least 15% of a perimeter of said first closed line and a perimeter of said second closed line, respectively, and wherein said reflective surface is configured for reducing a solid angle of light beams emitted through the one or more associated lenses of said plurality of lenses from a first solid angle between a predetermined solid angle and a sr to a second solid angle smaller than $7\pi/4$ sr.

20. A light emitting device comprising:

a carrier;

a plurality of light sources disposed on the carrier;

a lens plate disposed on the carrier, comprising a flat portion and a plurality of lenses covering the plurality of light sources; and a light shielding structure mounted on said lens plate, comprising a plurality of closed reflective barrier walls, each having an interior bottom edge disposed on said flat portion, an interior top edge at a height above said flat portion, and a reflective surface connecting the interior bottom edge and the interior top edge and surrounding two or more associated lenses of said plurality of lenses, wherein said height is at least 2 mm, wherein the interior bottom edge defines a first closed line and the interior top edge defines a second closed line, said first closed line and said second closed line comprising at least one curved portion over at least 15% of a perimeter of said first closed line and a perimeter of said second closed line, respectively, and wherein said reflective surface is configured for reducing a solid angle of light beams emitted through the two or more associated lenses of said plurality of lenses.

* * * * *